United States Patent [19]

Iguchi et al.

[11] Patent Number: 4,763,154

[45] Date of Patent: Aug. 9, 1988

[54] FOCUS DETECTING DEVICE AND IMAGE SIGNAL AMPLIFIER CIRCUIT THEREFOR

[75] Inventors: Susumu Iguchi, Yokohama; Daisuke Hata, Funabashi; Yoshimi Ohno, Kawasaki; Takayuki Hatase; Takao Yamaguchi, both of Yokohama; Kazumasa Aoki, Tokyo, all of Japan

[73] Assignee: Ricoh Company, Ltd., Tokyo, Japan

[21] Appl. No.: 946,032

[22] Filed: Dec. 24, 1986

[30] Foreign Application Priority Data

Dec. 27, 1985 [JP] Japan ................................ 60-295791
Feb. 27, 1986 [JP] Japan ................................ 61-042355
Feb. 28, 1986 [JP] Japan ................................ 61-042849

[51] Int. Cl.⁴ .............................................. G03B 3/00
[52] U.S. Cl. .................................................... 354/403
[58] Field of Search ............................... 354/402–409; 358/227, 211, 213.15, 213.16, 213.19, 213.23, 213.24, 213.26, 213.27, 213.28, 213.29, 213.31, 212; 356/1, 4; 250/201 PF, 201 AF, 204, 578, 209

[56] References Cited

U.S. PATENT DOCUMENTS

| | | | |
|---|---|---|---|
| 3,906,389 | 9/1975 | Matsumoto et al. | 354/403 X |
| 3,949,162 | 4/1976 | Malueg | 358/213.29 X |
| 4,217,608 | 8/1980 | MacGregor et al. | 358/212 X |
| 4,567,527 | 1/1986 | Yokomizo | 358/213.31 X |
| 4,571,047 | 2/1986 | Hirai | 354/403 |
| 4,618,235 | 10/1986 | Ishida et al. | 354/403 |

Primary Examiner—W. B. Perkey
Attorney, Agent, or Firm—Oblon, Fisher, Spivak, McClelland & Maier

[57] ABSTRACT

An image signal amplifier circuit includes an amplifier for amplifying an image signal from a focus detecting self-scanned image sensor, and a monitor photodetector for detecting the brightness of an object to be photographed. The amplification degree of the image signal is controlled by an automatic gain controller in the amplifier based on an output signal from the monitor photodetector so that the image signal as amplified will be of a constant level. An offset voltage is added to an output signal from the amplifier.

3 Claims, 21 Drawing Sheets (a)

FIG. 22
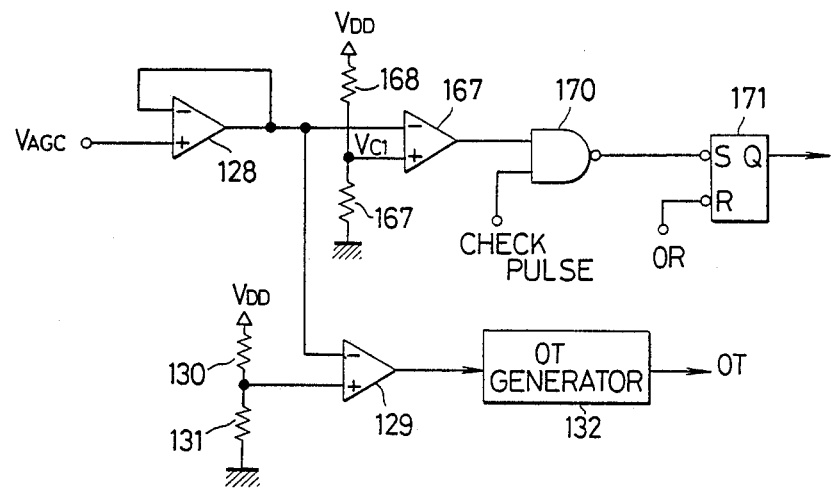
FIG. 24
FIG. 25
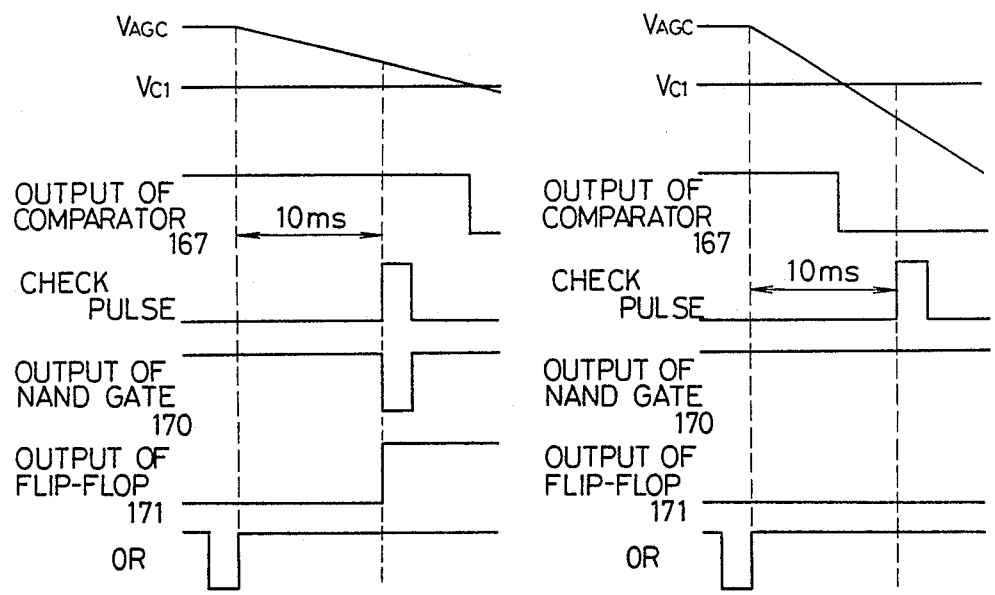

FOCUS DETECTING DEVICE AND IMAGE SIGNAL AMPLIFIER CIRCUIT THEREFOR

BACKGROUND OF THE INVENTION

1. Field of the Invention

The present invention relates to a focus detecting device for use in a camera and an image signal amplifier circuit for such a focus detecting device.

2. Discussion of Background

Some focus detecting devices for cameras employ a solid-state self-scanned image sensor such as a charge-coupled device (CCD) for amplifying an output signal thereof. In such focus detecting devices, a signal representing a black reference is produced prior to an image signal of the charge-coupled device. This black reference signal is generated by covering a few bits close to the output end of the photodiode array of the charge-coupled device with an aluminum electrode and using a signal from the covered area as a signal of the darkest portion of the output signal from the charge-coupled device. The effective output signal from the charge-coupled device can be obtained by amplifying the difference between the black reference signal and the next image signal sent from the charge-coupled device.

According to the above process, however, even a signal indicative of the dark portion of an object is considerably larger than the black reference level as indicated by the output signal from a charge-coupled device in FIG. 8 of the accompanying drawings. Where the output signal is converted to a digital signal and the digital signal is processed for focus detection in a camera, the voltage range represented by a in FIG. 8 is wasted. In order to increase the accuracy of the focus detection, it is necessary to make the degree of signal amplification as large as possible. If the signal shown in FIG. 8 were amplified, then the wasteful range a would also be increased, and a portion of the signal would extend beyond the input range of the analog-to-digital (A/D) converter.

As is known from Japanese Laid-Open Patent Publication No. 60(1985)-101516, a focus detecting device in a camera operates by amplifying and processing the image signal from a charge-coupled device for focus detection. When the integration (charge storage) time of the charge-coupled device becomes longer, a monitor signal from a monitor circuit in the charge-coupled device is compared with a reference voltage, and the degree of amplification for the image signal is varied in several steps according to the result of the degree of comparison. For example, the amplification is increased by the factor of 2, i.e., into degree of amplification that are twice, four times, and eight times larger; however, there are no intermediate degrees of amplification degrees between these increased discrete amplification degrees.

As described above, the degree amplification degree for the image signal in the focus detecting device is varied in a step-like discrete manner. Therefore, for an object which has a slightly low contrast and which has a brightness that the degree of amplification for the image signal is twice as large, the focus detection can properly be effected and the camera can be focused through focus adjustment. However, when an object is slightly brighter and the amplification degree is not increased, the amplification degree is not high enough to obtain proper focus detection, thereby resulting in a focusing failure.

Illumination of an object for a focus detecting device employing a charge-storage-type light detector is known from Japanese Laid-Open Patent Publication Nos. 57(1982)-105710, 60(1985)-46513, and 60(1985)-46514, for example.

According to Japanese Laid-Open Patent Publication No. 57(1982)-105710, however, it takes time to pick up the output from the light detector for the purpose of illuminating the object. With the arrangements of Japanese Laid-Open Patent Publication Nos. 60(1985)-46513 and 60(1985)-46514, it is necessary to measure the distance up to the object so as to determine whether the object is to be illuminated, and hence the focus detecting process is also time-consuming.

SUMMARY OF THE INVENTION

It is an object of the present invention to provide an image signal amplifier circuit for a focus detecting device, which increases the accuracy of the device.

Another object of the present invention is to provide an image signal amplifier circuit for a focus detecting device, which prevents its output signal from going beyond the input range of an analog-to-digital converter when an applied image signal is so small that it exceeds the ability of an automatic gain control means.

Still another object of the present invention is to provide an image signal amplifier circuit for a focus detecting device, which is capable of smoothly varying the amplification degree for an image signal for stable focus detection even when an object is dark.

A still further object of the present invention is to provide a focus detecting device which can effect focus detection in a reduced period of time.

According to the present invention, there is provided an image signal amplifier circuit for a focus detecting device for detecting the focus of a camera by processing an image signal from a self-scanned image sensor having a storage electrode and an analog shift register for transferring a stored charge from the storage electrode, the image signal amplifier circuit comprising monitor photodetector means for detecting the brightness of an object to be photographed by the camera, amplifier means having automatic gain control means for controlling the amplification degree of the image signal based on an output signal from the monitor photodetector means so that the amplified image signal from the image sensor will be of a constant level, and offset generator means for adding an offset voltage to an output signal from the amplifier means.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 22 is a circuit diagram, partly in block form, of a driver in an automatic focusing device according to another embodiment the present invention;

FIGS. 24 and 25 are timing charts of operation of the driver shown in FIG. 22.

DESCRIPTION OF THE PREFERRED EMBODIMENTS

Figure 9:
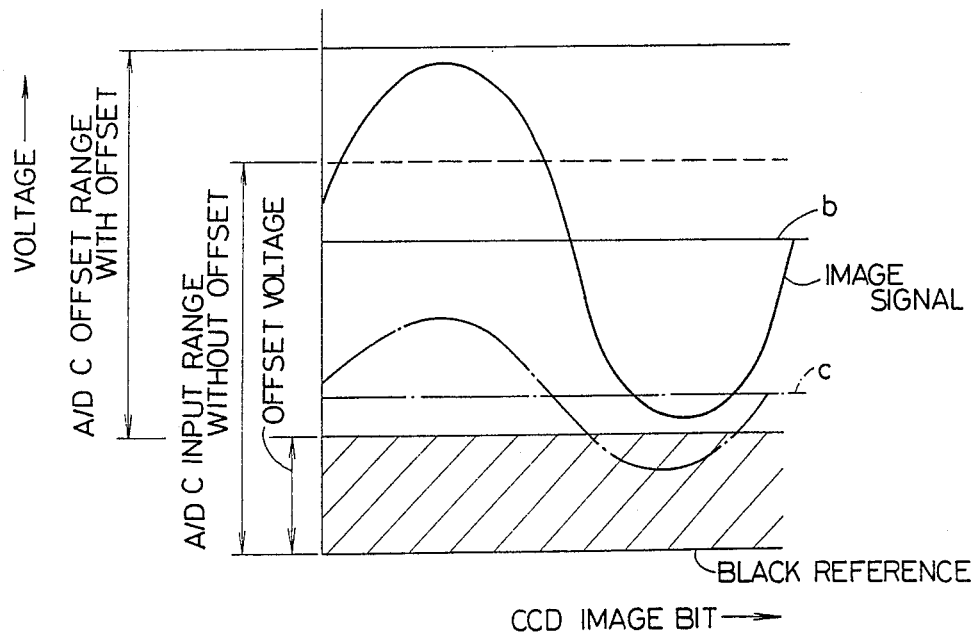

According to the principles of the present invention, an offset voltage is added to an amplified image signal as shown in FIG. 9 to exclude a wasteful portion of the image signal from the input range of an analog-to-digital (A/D) converter, and the amplification degree for the image signal is increased for effective utilization of the input range of the analog-to-digital converter to increase the accuracy of focus detection. When an automatic gain control means is operating in an amplifier, the image signal has a sufficiently high average level b. However, when the image signal is so small that it exceeds the ability of the automatic gain control means, the image signal is of a low average level c such that the image signal is partly below the offset voltage and extends beyond the input range of the analog-to-digital converter. When this happens, the offset voltage is eliminated to prevent the image signal from extending beyond the input range of the analog-to-digital converter.

Figure 1:
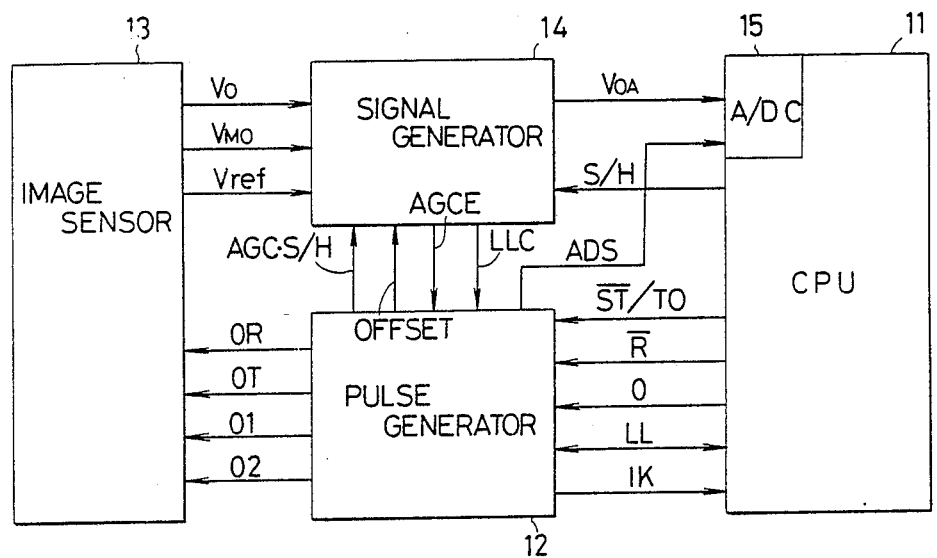
FIG. 1 is a block diagram of a focus detecting device according to an embodiment of the present invention.

FIG. 1 shows a focus detecting device according to an embodiment of the present invention.

In FIG. 1, when an $\overline{ST/TO}$ signal supplied from a microcomputer or central processing unit (hereinafter referred to as a "CPU") 11 to a pulse generator 12 changes from a high level to a low level, the pulse generator 12 generates a reset pulse $\phi R$ and applies this pulse to an image sensor 13. The image sensor 13 comprises a charge-coupled device for detecting light coming from an object to be photogrphed through an objective lens and a focus detecting optical system (not shown) of the camera with which the focus detecting device is associated. In response to the reset pulse $\phi R$, a storage electrode is reset, and an output voltage $V_{MO}$ and a reference voltage Vref of a monitor circuit are set to prescribed voltages. When the reset pulse $\phi R$ disappears, the output voltage $V_{MO}$ is lowered at a rate commensurate with the brightness of the object, and the reference voltage Vref remains at a substantially constant voltage. A signal processor 14 compares the output voltage $V_{MO}$ with a first reference voltage derived from the reference voltage Vref. When the output voltage $V_{MO}$ exceeds the first reference voltage, the signal processor 14 cause an AGCE signal to the pulse generator 12 to go high to apprise the pulse generator 12 of the completion of integration (charge storage) by the charge-coupled device 13.

When the AGCE signal goes high, the pulse generator 12 sends a shift pulse $\phi T$ to the charge-coupled device 13 and applies an IE signal to the CPU 11 to inform the CPU 11 of the completion of integration by the charge-coupled device 13. In response to the shift pulse $\phi T$, the charge-coupled device 13 transfers the charge of the storage electrode to an analog shift register. The charge-coupled device 13 then sequentially delivers the charge from the analog shift register as an image signal voltage $V_O$ to the signal generator 14 in response to free-running transfer pulses $\phi 1$, $\phi 2$ from the pulse generator 12. The signal processor 14 then amplifies the image signal $V_O$ to a level suitable as an input voltage to be applied to an analog-to-digital (A/D) converter 15, and applies the amplified image signal $V_O$ as a $V_{OA}$ signal to the A/D converter 15.

The pulse generator 12 supplies the CPU 11 with an ADS signal in synchronism with the $V_{OA}$ signal. In response to the IE signal from the pulse generator 12, the CPU 11 causes the A/D converter 15 to convert the $V_{OA}$ signal to a digital signal in synchronism with the ADS signal, and stores the digital signal in an internal memory. The CPU 11 processes data stored in the internal memory to detect the focus of the camera for determining the amount by which the objective lens is defocused.

Figure 2:
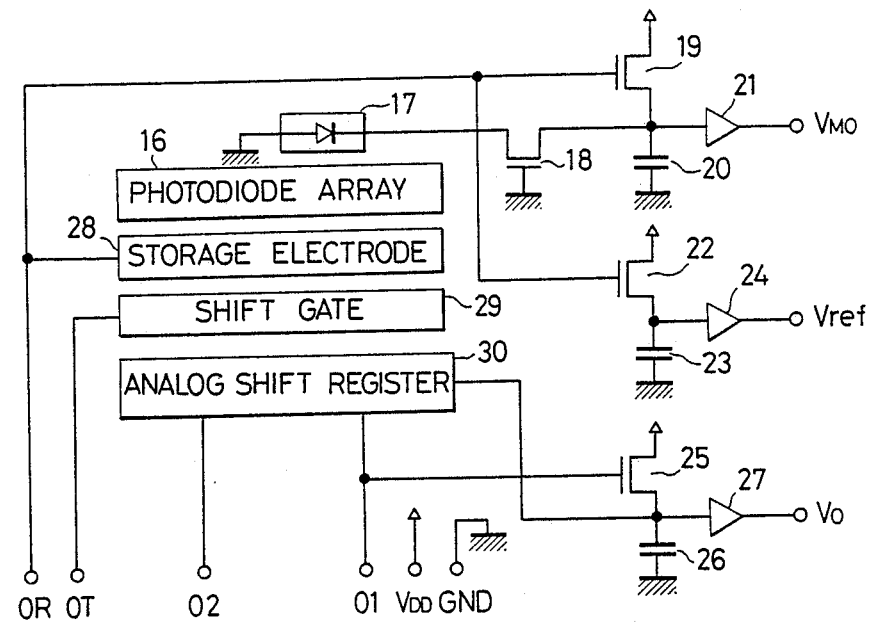
FIG. 2 is a circuit diagram, partly in block form, of a charge-coupled device in the focus detecting device.

FIG. 2 shows the charge-coupled device 13 in detail. The charge-coupled device 13 includes a monitor photodiode 17 disposed closely to a photodiode array 16 for detecting the brightness of the object. The charge-coupled device 13 includes a motor circuit comprising the monitor photodiode 17, field-effect transistors 18, 19, a capacitor 20, and a buffer amplifier 21. The charge-coupled device 13 also includes a reference voltage generator for generating a reference voltage, the reference voltage generator comprising a field-effect transistor 22, a capacitor 23, and a buffer amplifier 24. The charge-coupled device 13 also includes an image signal output circuit comprising a field-effect transistor 25, a capacitor 26, and a buffer amplifier 27.

When the reset pulse $\phi R$ is applied to the charge-coupled device 13, the charge of a storage electrode 28 is reset, and the field-effect transistors 19, 22 are turned on to charge the capacitors 20, 23 to prescribed voltages under a power supply voltage VDD The voltages charged across the capacitors 20, 23 are picked up as the monitor voltage $V_{MO}$ and the reference voltage Vref, respectively, through the buffer amplifiers 21, 24. Upon elimination of the reset pulse $\phi R$, the capacitor 20 is discharged by a photoelectric current flowing through the monitor photodiode 17, so that the voltage of the monitor signal $V_{MO}$ is dropped. Since the photoelectric current flowing through the monitor photodiode 17 varies with the brightness of the object, the rate at which the voltage of the monitor signal $V_{MO}$ falls is commensurate with the object brightness. Light from the object is detected by the photodiode array 16, which produces a photoelectric current flowing therethrough to store a charge in the storage electrode 28. When the shift pulse $\phi T$ is applied, a shift gate 29 is turned on thereby to transfer the charge from the storage electrode 28 to an analog shift register 30. The analog shift register 30 then sequentially transfers the charge in response to the transfer clock pulses $\phi 1$, $\phi 2$ thereby to discharge the capacitor 26, the voltage across which is issued as the image signal $V_O$ through the buffer amplifier 27. The field-effect transistor 25 is turned on by the transfer pulse $\phi 1$, charging the capacitor 26 to a prescribed voltage by which the field-effect transistor 25 is reset. The photodiode array 16 has a few bits through ten and a few bits close to its output end, covered or shielded by an aluminum electrode. An image signal produced by the shielded area is employed as a black-level reference signal at the time the image signal $V_O$ is amplified.

Figure 3:
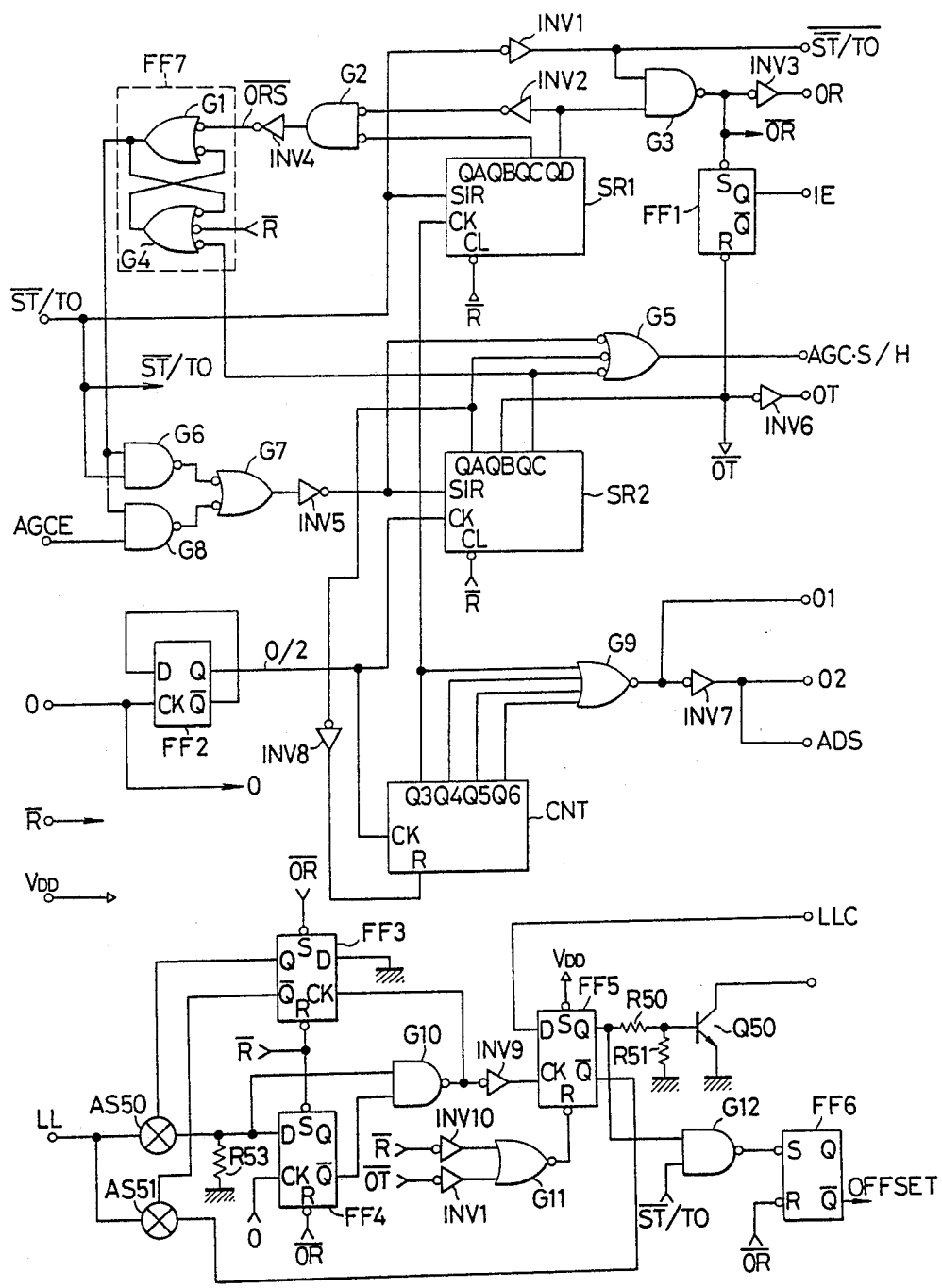
FIGS. 3 and 4 are block diagrams of a pulse generator and a signal processor, respectively, in the focus detecting device.
Figure 5:
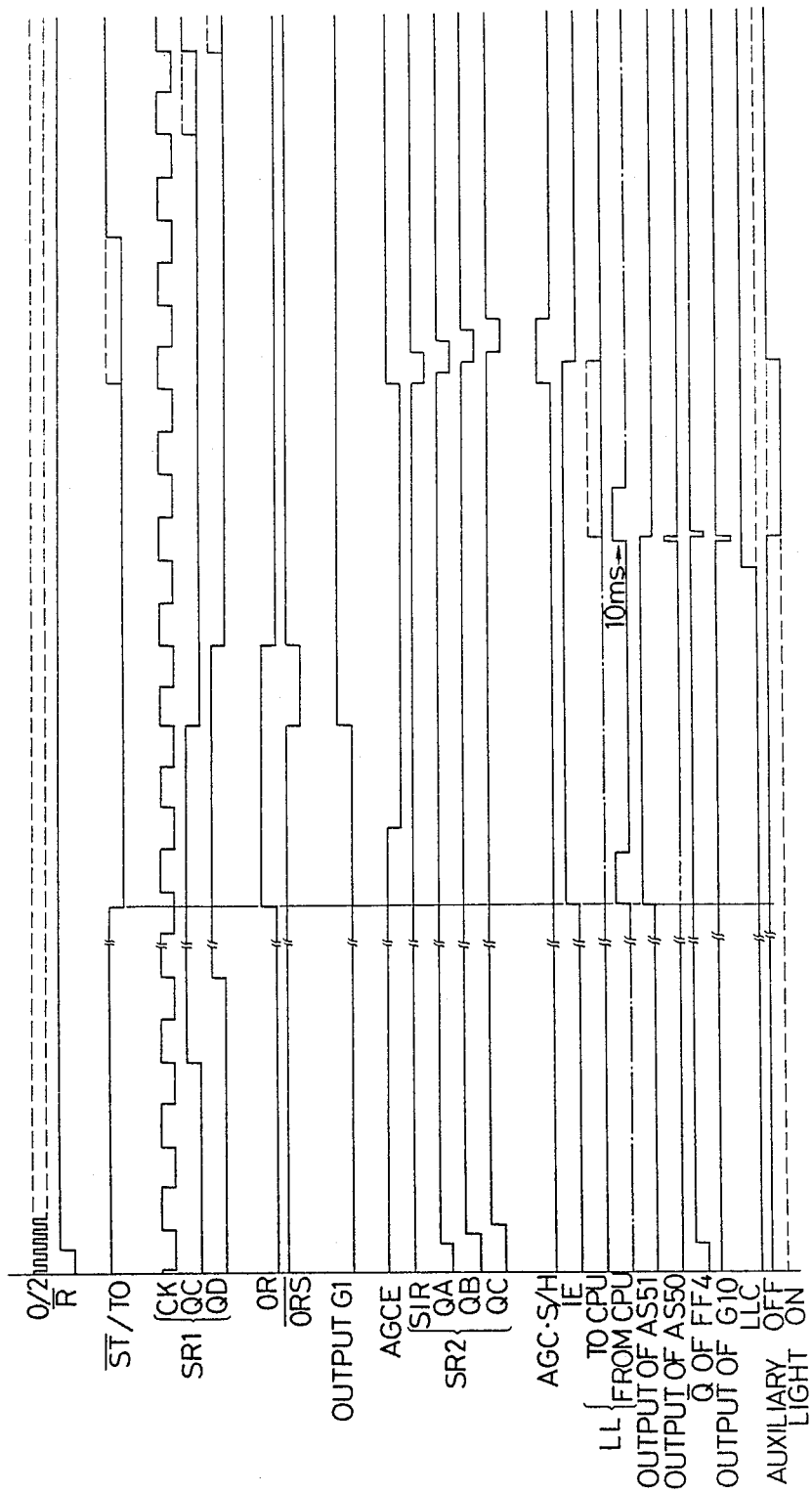
FIG. 5 is a timing chart of operation of the focus detecting device.

FIG. 3 shows a detailed circuit arrangement of the pulse generator 12, and FIG. 5 is a timing chart of operation of the focus detecting device.

When the power supply of the focus detecting device is switched on, an R signal is issued from the CPU 11 to reset shift registers SR1, SR2 and flip-flops FF3, FF7, to reset a flip-flop FF5 through an inverter INV10 and a NOR gate G11, and to set a flip-flop FF4. When the $\overline{ST/TO}$ signal from the CPU 11 goes from the high level to the low level, it is applied to an input terminal SIR of the shift register SR1 and is successively shifted in the shift register SR1 by a clock signal which is produced by frequency-dividing a clock signal $\phi$ by 16 with a flip-flop FF2 and a counter CNT. A NAND gate G3 is supplied with an inverted $\overline{ST/TO}$ signal from an inverter INV1 and an output signal from a fourth-bit output terminal QD of the shift register SR1. An output signal from the NAND gate G3 is inverted by an inverter INV3 into the reset pulse $\phi R$, which is then applied to the charge-coupled device 13. A NAND gate G2 is supplied with a signal from a third-bit output terminal QC of the shift register SR1 and an inverted signal from the fourth-bit output terminal QD thereof through an inverter INV2. An output signal from the NAND gate G2 is inverted by an inverter INV4 into a $\overline{\phi RS}$ pulse signal, which is delayed with respect to the reset pulse $\phi R$ by two or three clock pulses of the shift register SR1, as shown in FIG. 5. The terminal edge of the $\overline{\phi RS}$ pulse signal coincides with that of the reset pulse $\phi R$. An R-S flip-flop FF7 composed of NOR gates G1, G4 is reset by the $\overline{\phi RS}$ signal. NAND gates G6, G8 are opened by an output signal from the NOR gate G1.

The $\overline{\phi RS}$ signal is delayed with respect to the pulse $\phi R$ for the following reasons: There is a certain time delay for the reference voltage Vref and the monitor signal $V_{MO}$ produced by the charge-coupled device 13 as it is reset by the reset pulse $\phi R$ to reach prescribed levels after the reset pulse $\phi R$ is applied to the charge-coupled device 13. If the NAND gate G8 were opened prior to a time delay produced until these signals are delivered as the AGCE signal through the signal processor 14 and reach the NAND gate G8, the AGCE signal before it is reset by the reset by the reset pulse $\phi R$ would be applied via the NAND gate G8, and an integration completion signal would immediately be issued. To prevent this, the $\overline{\phi RS}$ is delayed to open NAND gate G8 upon elapse of a time interval in which the AGCE signal as the input signal for the NAND gate G8 is fully reset after the reset pulse $\phi R$ has been issued.

The output signal from the NAND gate G3 is applied as a $\overline{\phi R}$ signal to set a flip-flop FF1 for thereby rendering the IE signal high which is the output signal from the flip-flop FF1. The clock signal $\phi$ supplied from the CPU 11 is frequency-divided by 2 by the D-type flip-flop FF2, and the frequency-divided clock signal is applied to clock input terminals CK of the shift register SR2 and the counter CNT. The counter CNT has third through sixth output terminals Q3–Q6, from which output signals are supplied to a NOR gate G9. An output signal from the NOR gate G9 is delivered as the transfer pulse $\phi 1$ to the charge-coupled device 13, and is inverted by an inverter INV7 into the inverted transfer pulse $\phi 2$, which is applied to the charge-coupled device 13. The pulse $\phi 2$ from the inverter INV7 is also supplied as the ADS signal to the CPU 11, and employed as a synchronizing signal when converting into a digital signal the output signal from the signal processor 14 (which is the signal $V_{OA}$ produced by amplifying the image signal VO from the charge-coupled device 13 to a level suitable for an input voltage to be applied to the A/D converter 15).

After the reset pulse $\phi R$ has disappeared, the charge-coupled device 13 stores into the storage electrode 28 the charge produced by the photodiode array 16 and commensurate with the object brightness. At the same time, the output voltage $V_{MO}$ from the monitor circuit is dropped by the monitor photodiode 17. When the voltage $V_{MO}$ exceeds the first reference voltage, the AGCE signal is caused by the signal processor 14 to change from the low level to the high level. The AGCE signal passes through the NAND gate G8 which is opened by the output signal from the NOR gate G1, and is applied via a NOR gate G7 and an inverter INV5 to an input terminal SIR of the shift register SR2. The shift register SR2 successively shifts the applied signal as shown in FIG. 5 until it is shifted to a third bit, whereupon the output signal from a third-bit output terminal QC changes from the high level to the low level. This output signal from the third-bit output terminal QC resets the flip-flop FF7 to close the NAND gates G6, G8. Therefore, the input signal applied to the input terminal SIR of the shift register SR2 goes from the low level to the high level, and is successively shifted by the shift register SR2. The output signals from first- through third-bit output terminals QA, QB, QC of the shift register SR2 are shifted from each other by the period of the clock signal applied to the shift register SR2, and each are in the form of a pulse having a pulse duration equal to three periods of this clock pulse.

The output signal from the output terminal QB of the shift register SR2 is inverted by an inverter INV6 and then delivered as the shift pulse $\phi T$ to the charge-coupled device 13. The charge-coupled device 13 responds to the applied shift pulse $\phi T$ to open the shift gate 29 (FIG. 2) for thereby transferring the charge from the storage electrode 28 to the analog shift register 30. The output signal from the output terminal QA of the shift register SR2 is inverted by an inverter INV8 and then applied to a reset terminal R of the counter CNT to reset the same. Since the counter CNT is reset earlier than the shift pulse $\phi T$ is issued by one period of the clock signal applied to the shift register SR2, the transfer pulse $\phi 1$ applied to the charge-coupled device 13 goes high before the shift pulse $\phi 1$ is issued. The transfer pulse $\phi 1$ always goes high before the shift pulse $\phi T$ is fed to the charge-coupled device 13 while the charge is being transferred to the analog shift register by the transfer pulses $\phi 1$, $\phi 2$. Therefore, while the charge is being transferred from the storage electrode to the analog shift register by the shift pulse $\phi T$, charge transfer by the transfer pulses $\phi 1$, $\phi 2$ to the analog shift register is stopped without fail, thus preventing the respective bit charges from being mixed.

The signal applied to the input terminal SIR of the shift register SR2 and the signals from the output terminals QA, QB thereof are applied to a NOR gate G5. An output from the NOR gate G5 is in the form of a pulse having substantially the same timing as and slightly wider than the shift pulse φT, as shown in FIG. 5, and is delivered to the signal processor 14 as an AGC.S/H signal serving as a sample-and-hold pulse for storing a monitor circuit output voltage upon completion of integration by the charge-coupled device 13.

The output signal from the output terminal QB of the shift register SR2 is also applied to a reset terminal R of the R-S flip-flop FF1 to reset this flip-flop FF1 to change the IE signal from the high level to the low level. The transition of the IE signal from the high level to the low level indicates that the integration by the charge-coupled device 13 is completed, resulting in readiness for conversion of the image signal $V_{OA}$ from the signal processor 14 (which is produced by amplifying the image signal $V_O$ from the charge-coupled device 13). In response to a transition of the ADS signal from the high level to the low level, which is delivered in timed relation to the transfer pulse φ2, the CPU 11 commands the A/D converter 15 to convert the image signal $V_{OA}$ to the corresponding digital signal.

If the IE signal does not change from the high level to the low level upon elapse of a preset time (hereinafter referred to as a "first reference time") after the $\overline{ST/TO}$ signal has been changed from the high level to the low level by the CPU 11, i.e., if the output voltage $V_{MO}$ of the monitor circuit does not exceed the first reference voltage upon elapse of the first reference time since the rate of drop of the output voltage $V_{MO}$ is low because the object brightness is low, then the CPU 11 changes the $\overline{ST/TO}$ signal from the low level to the high level. The $\overline{ST/TO}$ signal is applied to the NAND gate G6 which has been open by the output signal from the R-S flip-flop FF7. Therefore, when the $\overline{ST/TO}$ signal changes from the low level to the high level, the shift pulse φT and the AGC·S/H pulse are produced in the same manner as when the AGCE signal is applied to the NAND gate G8, and the integration by the charge-coupled device 13 is finished.

If the IE signal changes from the high level to the low level before the first reference time elapses, then the CPU 11 holds the $\overline{ST/TO}$ signal at the low level even after the first reference time has elapsed, until the image signal $V_{OA}$ is converted to the digital signal in its full bits. After completion of the full-bit analog-to-digital conversion of the image signal $V_{OA}$, the CPU 11 renders the $\overline{ST/TO}$ signal high. At this time, the output signal of the R-S flip-flop FF7 is low and the NAND gate G6 is closed, preventing any signal from being applied to the input terminal SIR of the shift register SR2.

If the IE signal does not change from the high level to the low level upon elapse of a second reference time shorter than the first reference time, then the CPU 11 cause an LL terminal to go high. At this time, the LL terminal of the pulse generator 12 has already been serving as an input terminal since a D-type flip-flop FF3 has been set by the pulse φR (which is an inversion of the reset pulse φR) from the NAND gate G3 and an analog switch (transfer gate) AS50 has been opened and an analog switch AS51 has been closed by a noninverted output signal and an inverted output signal from the flip-flop FF3. When the LL terminal goes high, only a positive-going edge of the signal of the LL terminal is converted to a short pulse signal by the D-type flip-flop FF4 and a NAND gate G10. The D-type flip-flop FF3 is reset by this short pulse signal to close the analog switch AS50 and open the analog switch AS51, for thereby allowing the LL terminal to serve as an output terminal now. The output pulse from the NAND gate G10 is applied through an inverter INV9 to a clock input terminal CK of the D-type flip-flop FF5. If, at this time, a highlevel LLC signal has been applied from the signal processor 14 to the data terminal D of the flip-flop FF5, then the noninverted output signal from the flip-flop FF5 goes high and is applied via a resistor R50 to the base of a transistor Q50 to turn on the same. To the collector of the transistor Q50, there is coupled an auxiliary light source which can be energized to illuminate the object when the transistor Q50 is rendered conductive. The inverted output signal from the flip-flop FF5 is delivered via the analog switch AS51 to the CPU 11. The CPU 11 is thus apprised of the fact that the auxiliary light source is energized, by the inverted output signal (LL terminal voltage) from the flip-flop FF5. When the auxiliary light source is energized, the CPU 11 establishes a third reference time longer than the first reference time. If the IE signal from the pulse generator 12 does not go low even when the auxiliary light source has been energized and the third reference time has elapsed, then the CPU 11 changes the $\overline{ST/TO}$ signal from the low level to the high level to finish the integration by the charge-coupled device 13. The $\overline{ST/TO}$ signal from the CPU 11 passes through a NAND gate G12 that has been opened by the output signal from the flip-flop FF5 and is applied to a set terminal S of an R-S flip-flop FF6. The flip-flop FF6 is now set to render its inverted output signal low, which is then delivered as an OFFSET signal to the signal processor 14. The pulse $\overline{\phi T}$ issued from the NAND gate G3 is applied via an inverter INV11 and the NOR gate G11 to a reset terminal R of the flip-flop FF5, which is now reset.

Figure 4:
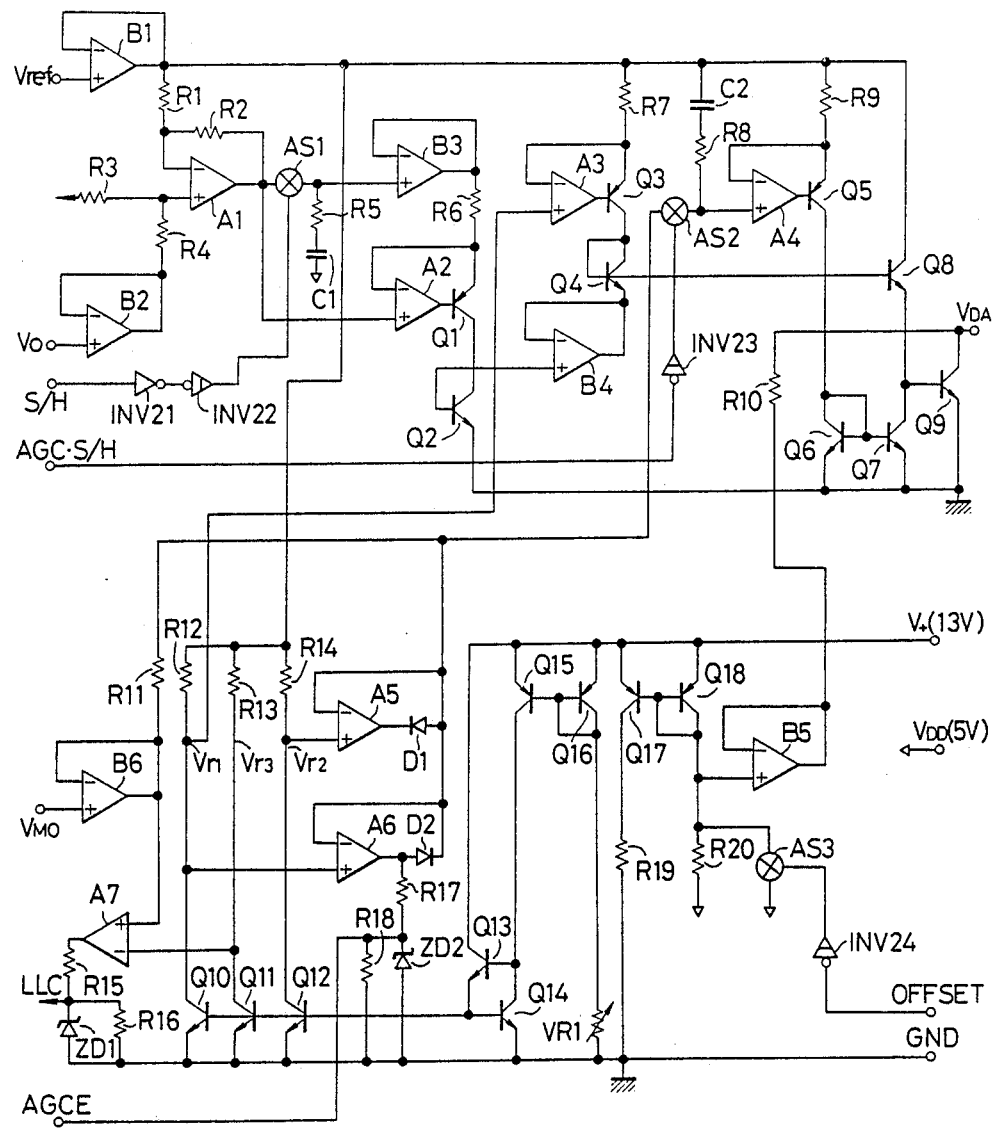

FIG. 4 shows a detailed circuit arrangement of the signal processor 14.

The image signal $V_O$ and the reference voltage Vref fed from the charge-coupled device 13 are applied respectively to buffer amplifiers B2, B1. The difference between the image signal $V_O$ and the reference voltage Vref is calculated by a differential amplifier composed of resistors R1 through R4 and an operational amplifier A1. The differential amplifier is supplied with an offset voltage having an intermediate potential $V_D$ between the power supply voltage +V and the ground potential GND. Assuming that R3=R1 and R4=R2, the output voltage $V_{OA1}$ of the operational amplifier A1 is given by:

$$V_{OA1} = V_D - \frac{R2}{R1}(Vref - V_0) \tag{1}$$

The output signal from the operational amplifier A1 is applied to a noninverting input terminal of an operational amplifier A2 and also to a sample-and-hold circuit composed of an analog switch AS1, a resistor R5, a capacitor C1, and a buffer amplifier B3. The analog switch AS1 is turned on and off by a sample-and-hold signal S/H which is fed from the CPU 11 through inverters INV21, INV22. While image signal data (at the black level) from the shielded area of the photodiode array 16 is being delivered from the CPU 11, the analog switch AS1 is turned on to hold that black-level data in the capacitor C1, which serves as an output voltage of the buffer amplifier B3. Across a resistor R6, there is applied a voltage which is the difference between the output voltage $V_{OB3}$ of the buffer amplifier B3 and the output signal $V_{OA1}$ of the operational amplifier A1. A current i1 flowing through the resistor R6 is therefore expressed by:

$$i1 = \frac{V_{OB3} - V_{OA1}}{R6} \tag{2}$$

Since a current substantially equal to the current i1 flows through the collector of a transistor Q2, the base-to-emitter voltage $V_{BEQ2}$ of the transistor Q2 is expressed by the following general formula:

$$V_{BEQ2} = \frac{kT}{q} \ln \frac{i1}{I_S} \tag{3}$$

where
k: the Boltzmann's constant,
q: the electron charge,
T: the absolute temperature, and
$I_S$: the reverse saturated current.

The output terminal of the buffer amplifier B1 is connected to resistors R12, R13, R14 through which there flows a constant current supplied by a constant-current circuit composed of transistors Q10 through Q16 and a variable resistor VR1. Voltage drops are therefore developed across the resistors R12, R13, R14, respectively. The voltages produced across the resistors R12, R14, R13 are hereinafter referred to as first, second, and third reference voltages Vr1, Vr2, Vr3, respectively. The first reference voltage Vr1 is applied to the noninverting input terminal of an operational amplifier A3. A current i2 flowing through a resistor R7 is therefore given by:

$$i2 = \frac{Vr1}{R7} \tag{4}$$

Since a current substantially equal to the current i2 flows through the collector of a transistor Q4, the base-to-emitter voltage $V_{BEQ4}$ of the transistor Q4 is expressed by:

$$V_{BEQ4} = \frac{kT}{q} \ln \frac{i2}{I_S} \tag{5}$$

The monitor circuit output voltage $V_{MO}$ supplied from the charge-coupled device 13 are applied via a buffer amplifier B6 and a resistor R11 to a sample-and-hold circuit comprising an analog switch AS2, a resistor R8, a capacitor C2, and an operational amplifier A4. The analog switch AS2 has a control gate supplied with the AGC√S/H signal from the pulse generator 12 via an inverter INV23. Inasmuch as the AGC·S/H signal is issued in substantially timed relation to the shift pulse φT, the sample-and-hold circuit holds the monitor circuit output voltage immediately after the integration by the charge-coupled device 13 is completed. Assuming that the difference between this sampled and held voltage and the reference voltage is expressed as $V_{AGC}$, a current i3 flowing through a resistor R9 is given as follows:

$$i3 = \frac{V_{AGC}}{R9} \tag{6}$$

Since the collector currents of transistors Q6, Q7, Q8 are substantially equal to the current i3, the base-to-emitter voltage $V_{BEQ8}$ of the transistor Q8 is expressed by:

$$V_{BEQ8} = \frac{kT}{q} \ln \frac{i3}{I_S} \tag{7}$$

From the equations (3), (5), and (7), the base-to-emitter voltage $V_{BEQ9}$ of a transistor Q9 is given as follows:

$$\begin{aligned} V_{BEQ9} &= V_{BEQ2} + V_{BEQ4} - V_{BEQ8} \\ &= \frac{kT}{q} \ln \frac{i1 \cdot i2}{I_S \cdot i3} \end{aligned} \tag{8}$$

Assuming that the voltage across a resistor R10 is expressed by $V_{R10}$, a current i4 flowing through the resistor R10 is given by:

$$i4 = \frac{V_{R10}}{R10} \tag{9}$$

The base-to-emitter voltage $V_{BEQ9}$ of a transistor Q9 is expressed by:

$$V_{BEQ9} = \frac{kT}{q} \ln \frac{i4}{I_S} \tag{10}$$

From the equation (10), the current i4 is expressed by:

$$i4 = I_S \cdot \exp\left(\frac{q}{kT} \cdot V_{BEQ9}\right) \tag{11}$$

By substituting the equation (8) for $V_{BEQ9}$ in the equation (11), $$i4 = I_S \cdot \exp\left(\frac{q}{kT} \cdot \frac{kT}{q} \cdot \ln \frac{i1 \cdot i2}{I_S \cdot i3}\right) = \frac{i1 \cdot i2}{i3} \tag{12}$$

Thus, $$V_{R10} = i4 \times R10 = \frac{i1 \cdot i2}{i3} \times R10$$

By putting the equations (2), (4), and (6) in the equation (13), $$V_{R10} = \frac{(V_{OB3} - V_{OA1}) \times Vr1 \times R9}{R6 \times R7 \times V_{AGC}} \cdot R10 \tag{13}$$

With $(V_{OB3} - V_{OA1})$ expressed as $V_{IN}$ and $R9/R7 = K$, $$\frac{V_{R10}}{V_{IN}} = K \frac{Vr1}{V_{AGC}} \tag{14}$$

$V_{R10}/V_{IN}$ is the degree of amplification of this amplifier section, expressed as G, and given by:

$$G = K \frac{Vr1}{V_{AGC}} \tag{15}$$

The second reference voltage Vr2 is applied to a noninverting input terminal of an operational amplifier A5, which cooperates with a diode D1 in constituting a first limiter circuit. The operational amplifier A5 has an inverting input terminal supplied with the monitor circuit output voltage $V_{MO}$ from the charge-coupled device 13 through the buffer amplifier B6 and the resistor R11. When the monitor circuit output voltage does not drop to the second reference voltage, a voltage equal to the second reference voltage Vr2 is applied by the first limiter circuit to the analog switch AS2 of the sample-and-hold circuit.

The first reference voltage Vr1 is applied to a noninverting input terminal of an operational amplifier A6, which cooperates with a diode D2 in constituting a second limiter circuit. The operational amplifier A6 has an inverting input terminal supplied with the monitor circuit output voltage $V_{MO}$ from the charge-coupled device 13 through the buffer amplifier B6 and the resistor R11. When the monitor circuit output voltage exceeds the first reference voltage, a voltage equal to the first reference voltage Vr1 is applied by the second limiter circuit to the analog switch AS2 of the sample-and-hold circuit. Therefore, the sample-and-hold circuit produces an output voltage which is equal to the voltage between the first and second reference voltages.

The voltage at the junction between the output terminal of the operational amplifier A6 and the diode D2 is substantially 0 V when the monitor circuit output voltage is within the first reference voltage, rendering the AGCE signal to the pulse generator 12 low. The monitor circuit output voltage starts dropping at the same time that the reset pulse $\phi R$ disappears, and when it exceeds the first reference voltage, the voltage at the above junction is substantially equalized to a voltage derived by subtracting the first reference voltage Vr1 from the reference voltage Vref, making the AGCE signal high. This signal is fed to the pulse generator 12 to cause the same to produce the shift pulse $\phi T$, thereby completing the integration by the charge-coupled device 13. Resistors R17, R18 and a zener diode ZD2 serve to match the output voltage of the operational amplifier A6 with the input level of the pulse generator 12.

The third reference voltage is applied to an inverting input terminal of a comparator A7 with its noninverting input terminal supplied with the monitor circuit output voltage from the charge-coupled device 13 through the buffer amplifier B6. When the monitor circuit output voltage is in excess of the third reference voltage, the output signal of the comparator A7 goes low and is delivered as the LLC signal to the pulse generator 12. As described above, the pulse generator 12 checks the condition of the LLC signal with the signal applied by the CPU 11 to the LL terminal for energizing or de-energizing the auxiliary light source. Resistors R15, R16 and a zener diode ZD1 serve to match the output voltage of the comparator A7 with the input level of the pulse generator 12.

The first, second, and third reference voltages Vr1, Vr2, Vr3 have respective magnitudes of the relationship: Vr1>Vr2>Vr3. The second reference voltage Vr2 virtually limits the minimum value of $V_{AGC}$ in the equation (15). In this embodiment, the first reference voltage Vr1 is of 3V and the second reference voltage Vr2 is of 375 mV, giving an amplification factor of 8 at maximum. As long as the monitor circuit output voltage is between Vr1 and Vr2, $V_{R10}$ in the equation (13) can be held at constant. By selecting the second and third reference voltages Vr2, Vr3 and the first and second reference times T1, T2 to meet the following relationship:

$$\frac{T2}{T1} = \frac{Vr3}{Vr2}$$

the relationship between the monitor circuit output voltage and the second reference voltage Vr2 can be known before the shift pulse $\phi T$ is issued, i.e., when the second reference time is reached. Assuming that T2/T1=0.1, Vr3 is of 37.5 mV.

A resistor R19 and transistors Q17, Q18 jointly constitute a bias current circuit for passing a constant current through a resistor R20, across which a constant voltage $V_{R20}$ is produced. A voltage added as an offset voltage to the intermediate voltage $V_D$ is applied to one terminal of the resistor R10 through a buffer amplifier B5. The A/D converter 15 of the CPU 11 divides the potential range from the ground potential GND to the intermediate potential $V_D$ into 256 with 8 bits.

An ordinary object to be photographed has highlights and shadows, and the shadows are not completely black. Study of an image signal generated by the charge-coupled device 13 indicates, therefore, that a signal representative of a shadow of the object has a level which is considerably higher than that of the signal produced from the aluminum-shielded area of the photodiode array. The range of the A/D converter 15 can effectively be utilized by increasing the amplification factor of the amplifier section by adding an offset voltage to the image signal $V_{OA}$ applied to the A/D converter 15 such that the level of the image signal corresponding to the shadows of the object will match the lower limit of the input range of the A/D converter 15. The voltage $V_{R20}$ developed across the resistor R20 is employed as such an offset voltage.

The OFFSET signal from the pulse generator 12 is applied to an analog switch AS3 via an inverter INV24. When the OFFSET signal goes low, the analog switch AS3 is turned on to provide a short circuit across the resistor R20, thus eliminating the offset voltage. The OFFSET signal is rendered low and issued by the pulse generator 12 when the auxiliary light source is energized and the third reference time elapses. When the OFFSET signal goes low under these conditions, the image signal from the charge-coupled device 13 is extremely low. With the offset voltage remaining applied, the output signal $V_{OA}$ is not of a sufficient amplitude and level even if the amplification factor of the amplifier section is maximized, and a substantial portion of the output signal $V_{OA}$ is included in the offset voltage, with the result that no input signal which would meet the range of the A/D converter 15 can be produced. Under the above conditions, the offset voltage is eliminated to 0 V to allow the portion of the output signal $V_{OA}$ which would be included in the offset voltage to be applied to the A/D converter 15. This enables the camera to be focused on an object of low brightness.

Figure 6:
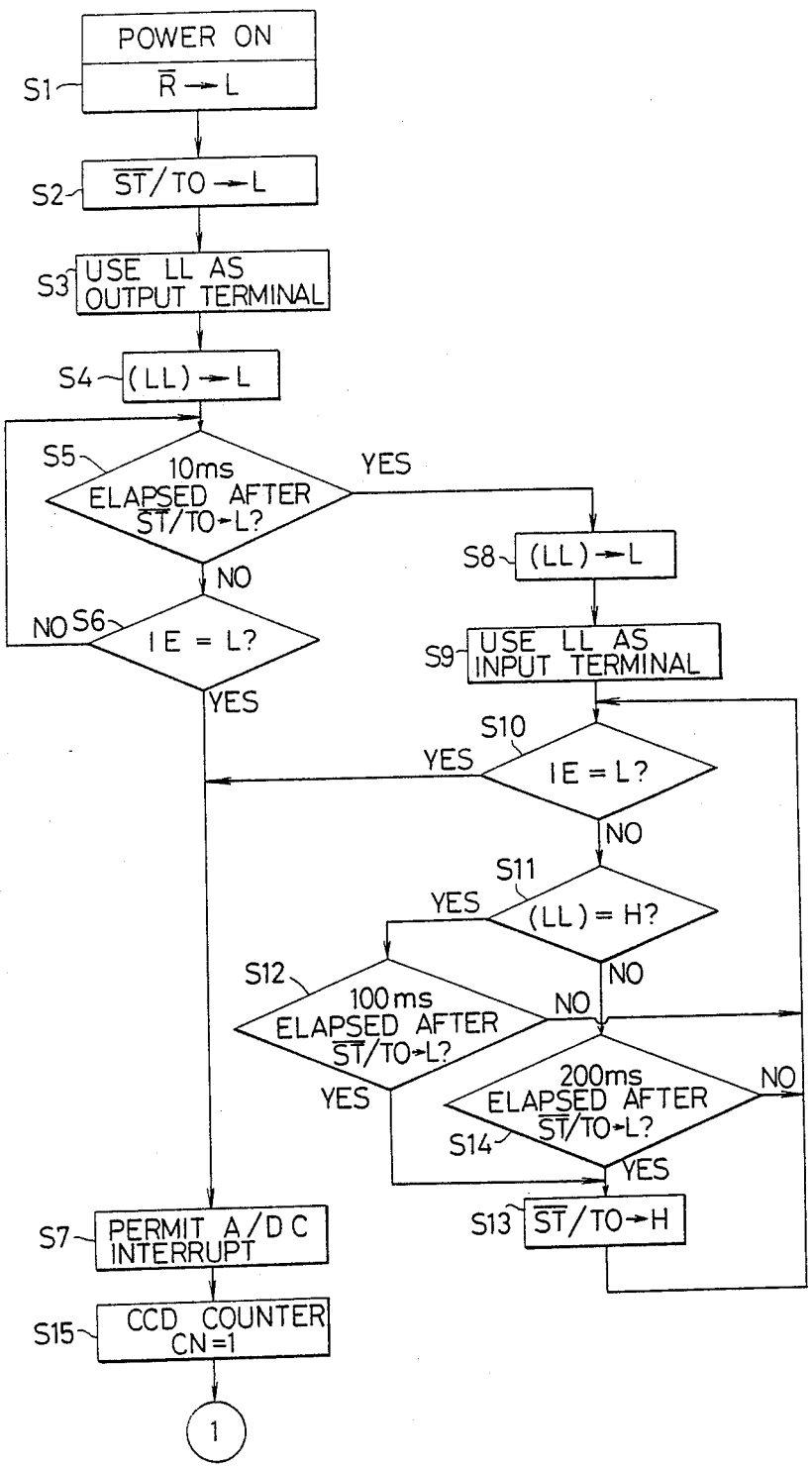
FIGS. 6 and 7 are a flowchart of an operation sequence of a central processing unit (CPU) in the focus detecting device.
Figure 7:
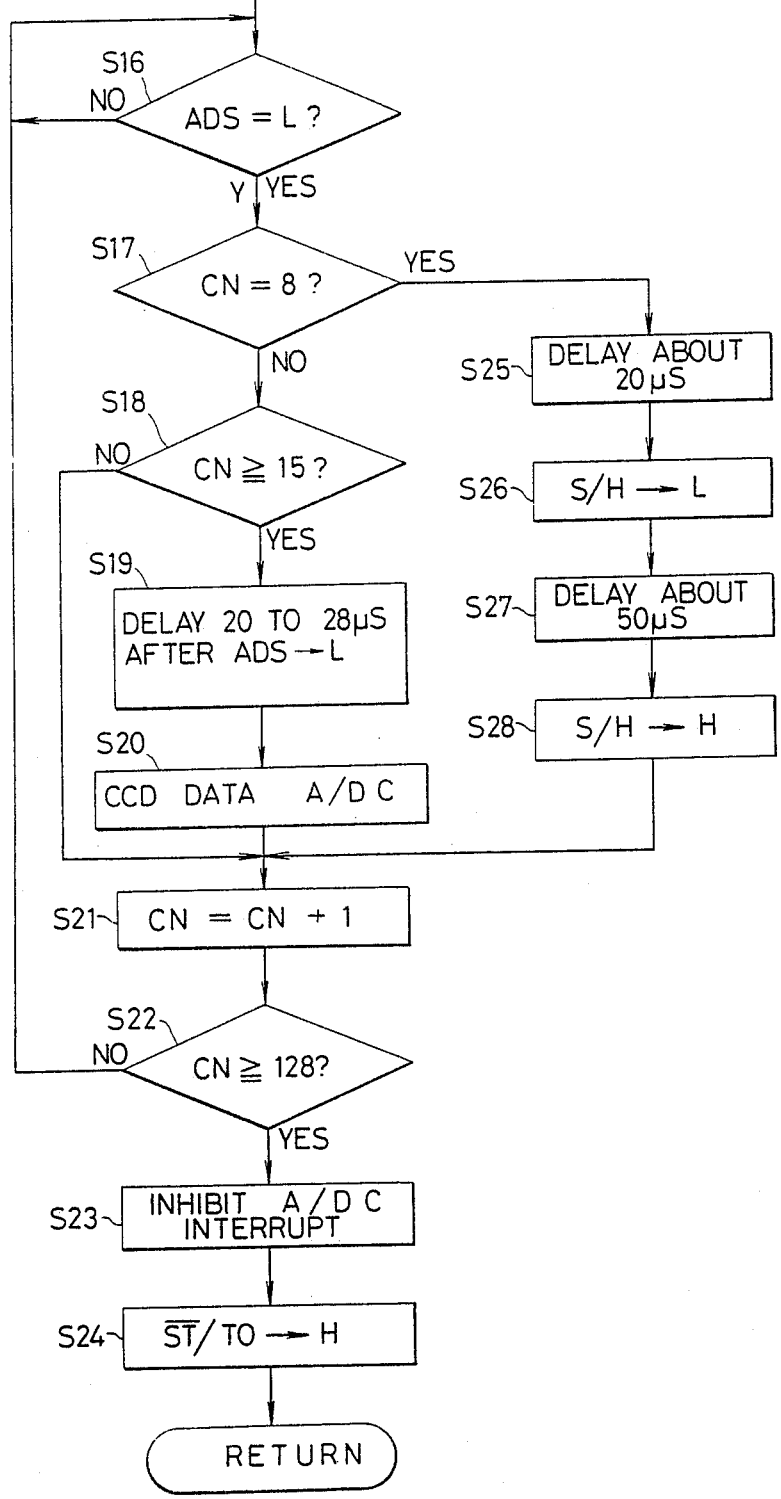
Figure 8:
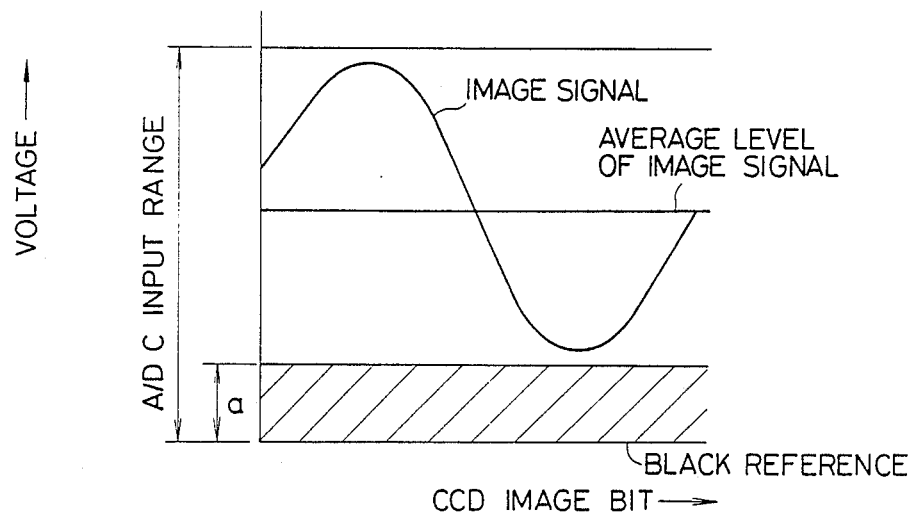
FIGS. 8 and 9 are diagrams explaining the principles of the present invention.

FIGS. 6 and 7 illustrate a flowchart of an operation sequence of the CPU 11.

When the power supply is switched on, the CPU 11 renders the $\overline{R}$ signal low in a step S1 to reset the pulse generator 12, and renders the $\overline{ST/TO}$ signal low in a step S2 to enable the pulse generator 12 to generate the reset pulse $\phi R$. The CPU 11 then uses the LL terminal as an output terminal in a step S3 and renders the LL terminal low in a step S4. A step S5 thereafter ascertains whether 10 ms (second reference time) has elapsed after the $\overline{ST/TO}$ signal went low. If the second reference time has not elapsed, control goes to a step S6 which checks the IE signal. If the IE signal is low, then control proceeds to a step S7. If the IE signal is high, then control returns to the step S5.

If the second reference time has elapsed in the step S5, then control goes to a step S8 in which the LL terminal is rendered high, and then to a step S9 in which the LL terminal is used as an input terminal. The step S9 is followed by a step S10 which checks the IE signal. If the IE signal is low, then control goes to a step S7. If the IE signal is high, then the LL terminal is checked in a step S11. If the LL terminal is high because the object is very bright, then a step S12 ascertains whether 100 ms (first reference time) has elapsed after the $\overline{ST/TO}$ signal went low. If the first reference time has not elapsed, then control goes back to the step S10. If the first reference time has elapsed, then control goes to a step S13 in which the $\overline{ST/TO}$ signal is rendered high to enable the pulse generator 12 to generate the shift pulse $\phi T$, and thereafter control returns to the steps S10. If the object is low in brightness and the LL terminal is low in the S11, then a step S14 ascertains whether 200 ms (third reference time) has elapsed after the $\overline{ST/TO}$ signal went low. If the third reference time has not elapsed, then control goes back to the step S10. If the third reference time has elapsed, then control goes to the step S13 in which the $\overline{ST/TO}$ signal is rendered high to enable the pulse generator 12 to generate the shift pulse $\phi T$, and thereafter control returns to the steps S10.

The step S7 which follows the step S6 or S10 permits an interrupt for analog-to-digital conversion. Then, the CPU 11 sets a CCD counter to "1" in a step S15. A step S16 checks the ADS signal. If the ADS signal is high, the checking process in the step S16 is repeated. If the ADS signal is low, then control proceeds to a step S17 which determines whether or not the CCD counter CN is "8". If the CCD counter CN is not "8", then a step S18 ascertains whether the CCD counter CN is "15" or more. The photodiode array 16 of the charge-coupled device 13 has on its output terminal four dummy bits and next ten bits shielded by the aluminum electrode. If the CCD counter CN is not "15" or more, then control jumps to a step S21 in which the CCD counter CN is incremented and then to a step S22 which checks if the CCD counter CN is "128" or more. If the CCD counter CN is not "128" or more, then control returns to the step S16. If the CCD counter CN reaches "8", then control goes from the step S17 to a step S25 which waits for about 20 microseconds. Thereafter, a step S26 renders the S/H signal low, and a step S27 waits for approximately 50 microseconds. The step S27 is followed by a step S28 which renders the S/H signal high to enable the signal processor 14 to sample and hold the data from the shielded area of the charge-coupled device 13. Control goes from the step S28 to the step S21. If the CCD counter CN reaches "15" or more, control proceeds from the step S18 to a step S19 which waits for 20 to 28 microseconds after the ADS signal went low. Then, the image signal $V_{OA}$ from the signal processor 14 is converted in a step S20 by the A/D converter 15 to a digital signal, which is stored in a memory. The step S20 is thereafter followed by the step S21. If the CCD counter CN reaches "128", then control goes from the step S22 to a step S23 in which an A/D conversion interrupt is inhibited. A step S24 then renders the $\overline{ST/TO}$ signal high. The CPU 11 applies free-running pulses $\phi$ to the pulse generator 12, and processes the memory data for camera focus detection.

With the aforesaid embodiment, a monitor signal from the monitor circuit is stored into the memory means in substantially the same timing as shift pulses of the self-scanned image sensor, and an image signal is amplified at the amplification degree which meets the relationship:

$$G = K \cdot \frac{V_{r1}}{V_M}$$

where $V_M$ is the monitor signal stored in the memory means and $V_{r1}$ is the reference signal. Therefore, the amplification degree varies smoothly even if an object to be stably photographed is dark, and focus detection can be effected.

Since an offset voltage is added to the amplified image signal, a wasteful portion of the image signal can be excluded from the input range of the analog-to-digital converter for increasing the amplification degree for the image signal for higher focus detection accuracy. The offset voltage can be eliminated or reduced by detecting when the ability of the automatic gain control means is exceeded. Accordingly, even if the object is of low brightness and the image signal is small, the image signal is prevented from extending beyond the input range of the analog-to-digital converter, thereby allowing focus detection.

Figure 10:
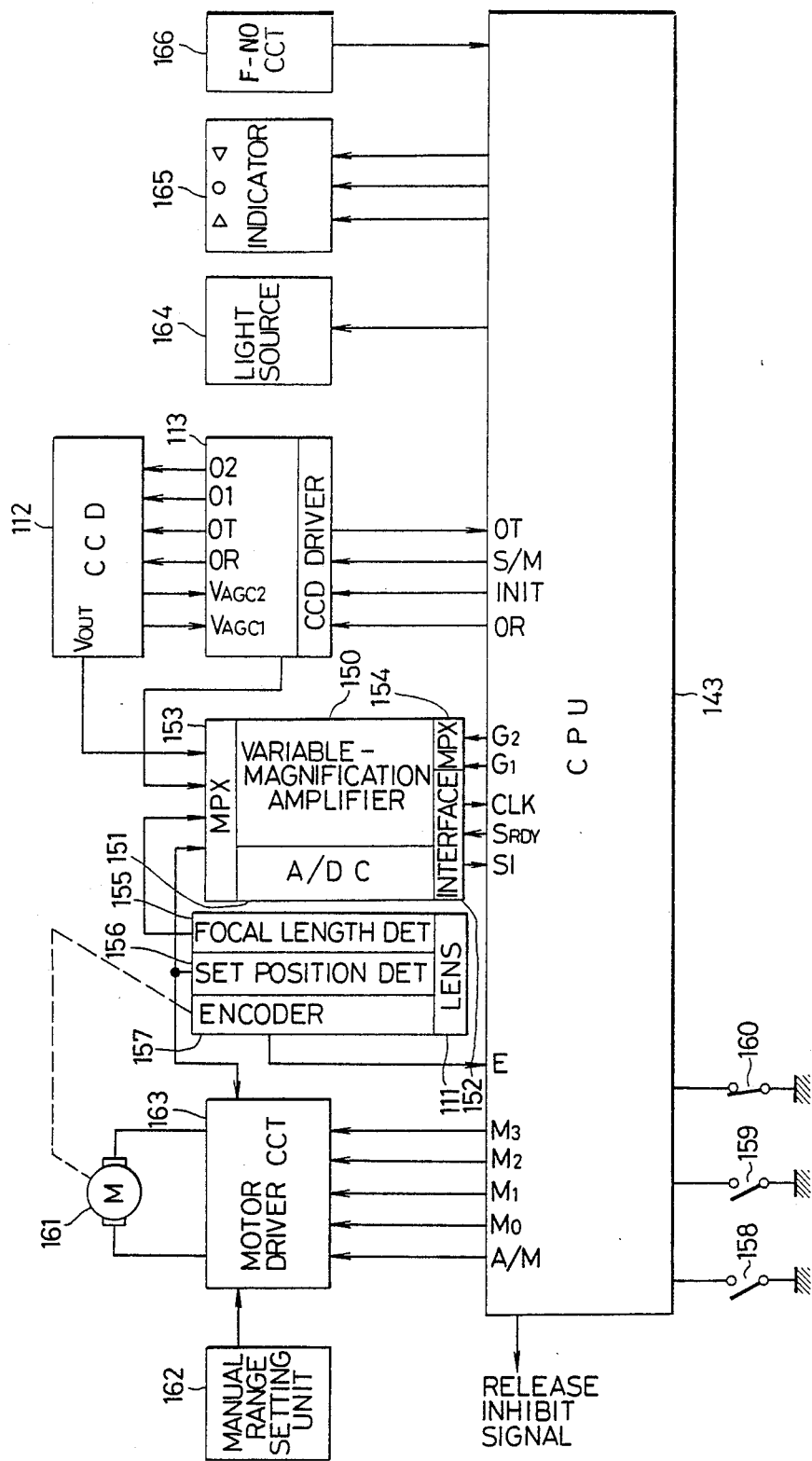
FIG. 10 is a block diagram of an automatic focusing device to which the present invention is applied.
Figure 11:
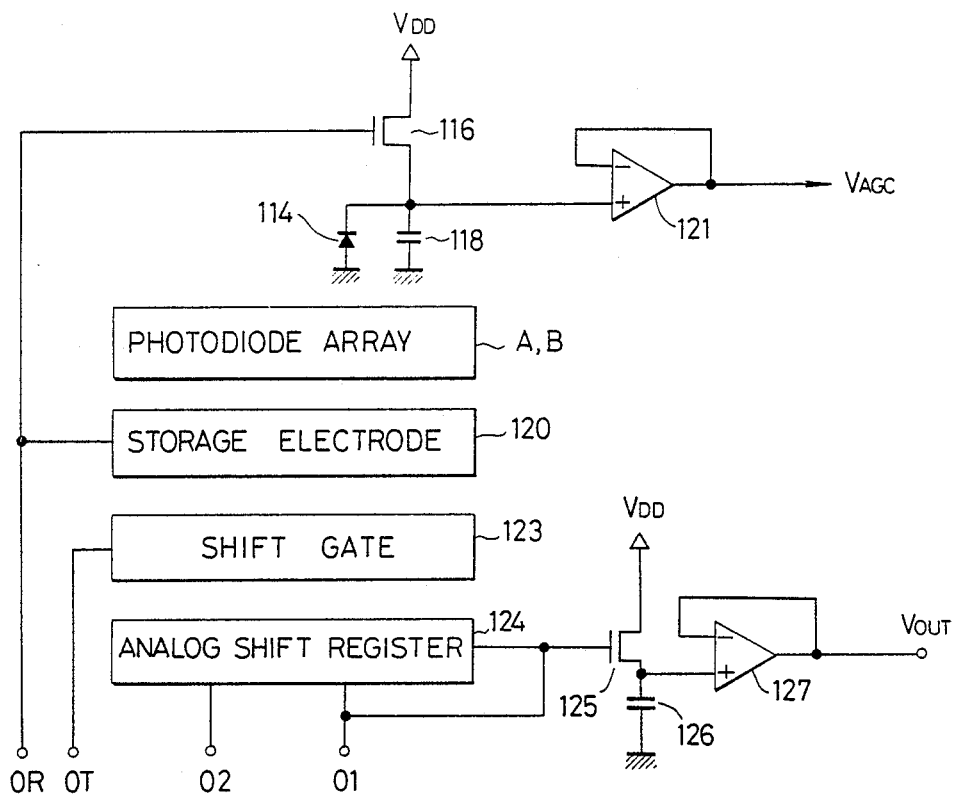
FIG. 11 is a circuit diagram, partly in block form, of a charg-coupled device in the automatic focusing
Figure 12:
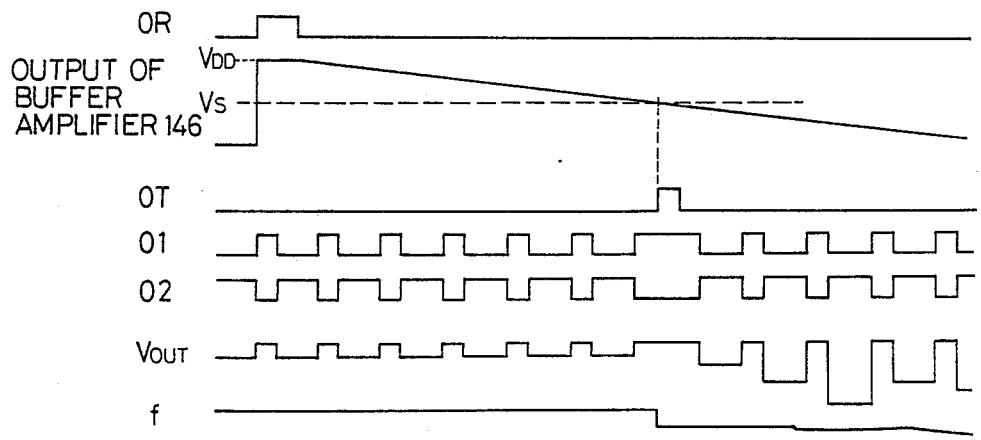
FIG. 12 is a timing chart of operation of the charge-coupled device shown in FIG. 11.

FIG. 10 shows an automatic focusing device incorporating the principles of the present invention. Light coming from an object to be photographed passes through an object lens 111 of a camera, and is focused by an optical system onto a charge-coupled device 112, which is driven by a CCD driver circuit 113. As illustrated in FIG. 11, the charge-coupled device 112 has a linear photodiode array A, B and a monitor photodiode 114. The linear photodiode array A, B has righthand and lefthand half portions A, B which are equally divided by the optical axis of the objective lens 111, with the monitor photodiode 114 being disposed laterally of one of the photodiode array portions A, B. FIG. 12 shows a timing chart of operation of the charge-coupled device 112. In FIG. 12, when a reset pulse $\phi R$ from the charge-coupled device 12 is of a high level, a field-effect transistor 116 is turned on to charge a capacitor 118 with a power supply $V_{DD}$, and a storage electrode 120 is reset. When the reset pulse $\phi R$ goes low, a photoelectric current commensurate with the brightness distribution of an object image flows through the photodiode array A, B to store a charge in the storage electrode 120. At the same time, the photoelectric current flows through the monitor photodiode 114 to lower the potential across the capacitor 118. The potential of the capacitor 118 is issued through a buffer amplifier 121 to the driver circuit 113. In response to a transfer pulse $\phi T$ from the driver circuit 113, a shift gate 123 is opened to transfer the charge stored in the storage electrode 120 into an analog shift register 124. The charge is then issued from the analog shift register 124 successively as a video signal $V_{OUT}$ through a field-effect transistor 125, a capacitor 126, and a buffer amplifier 127 in response to pulses $\phi1$, $\phi2$ from the driver circuit 113.

Figure 13:
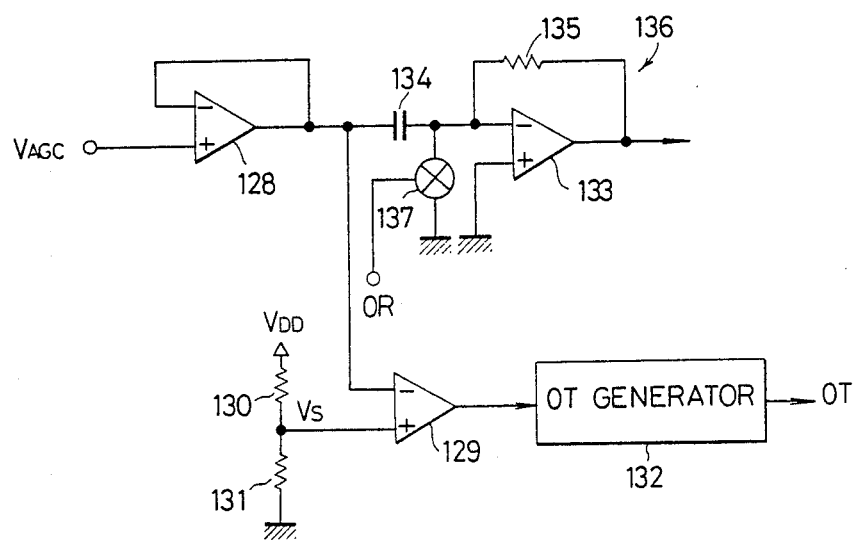
FIG. 13 ia diagram, partly in block form, of a driver in the automatic focusing device.
Figure 14:
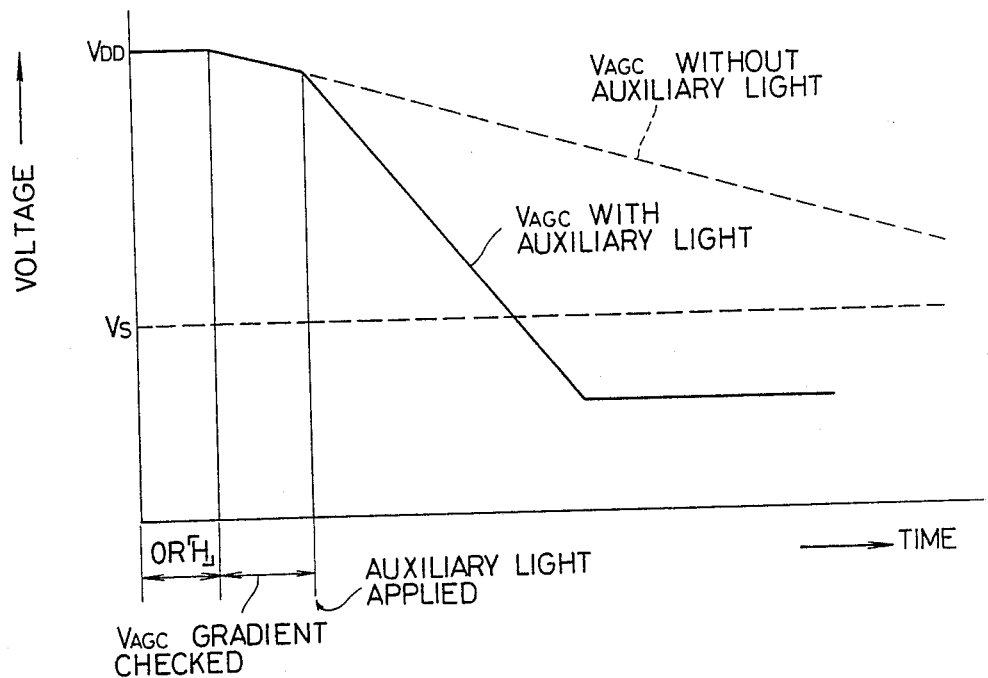
FIG. 14 is a timing chart of operation of the driver.
Figure 15:
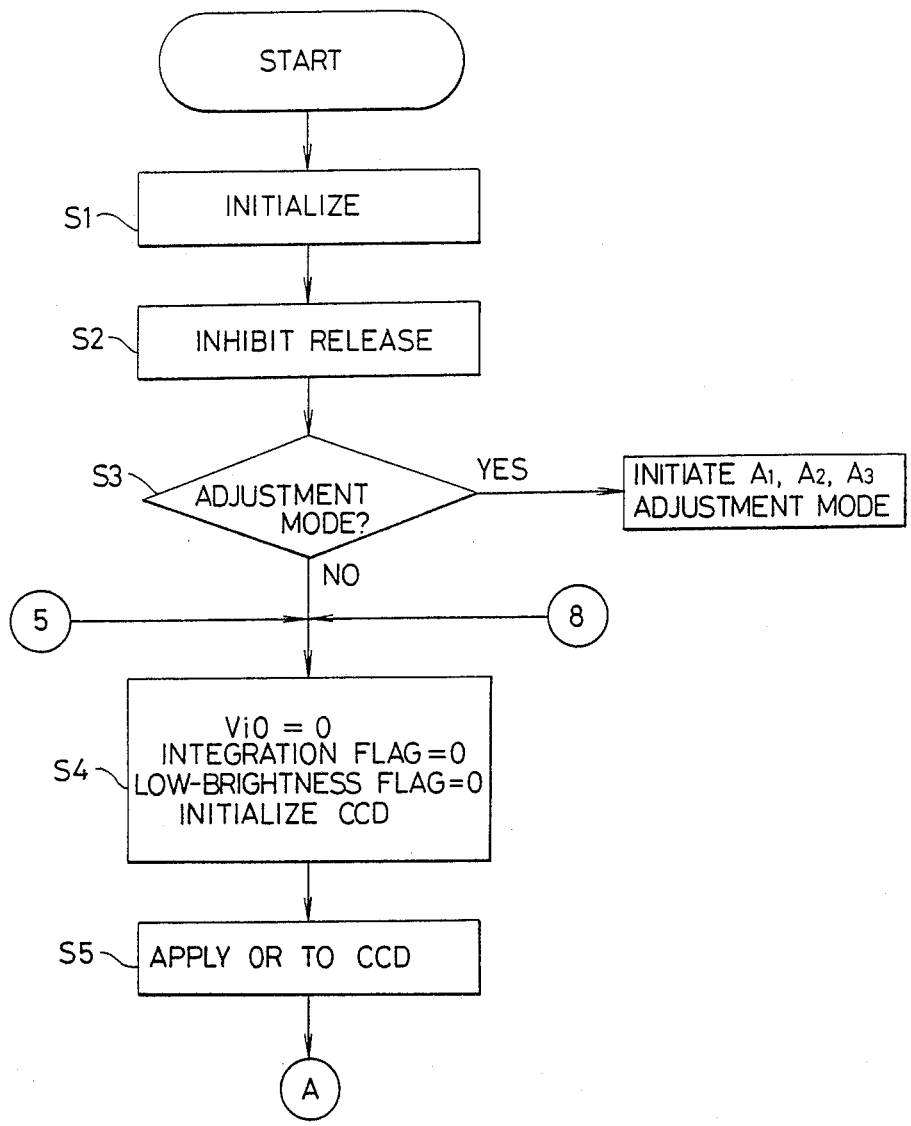
FIGS. 15(a),(15(b),16,17(a),17(b), 18,19,20 and 21 are flow charts of an operation sequence of a CPU in the automatic focusing sdevice.
Figure 15B:
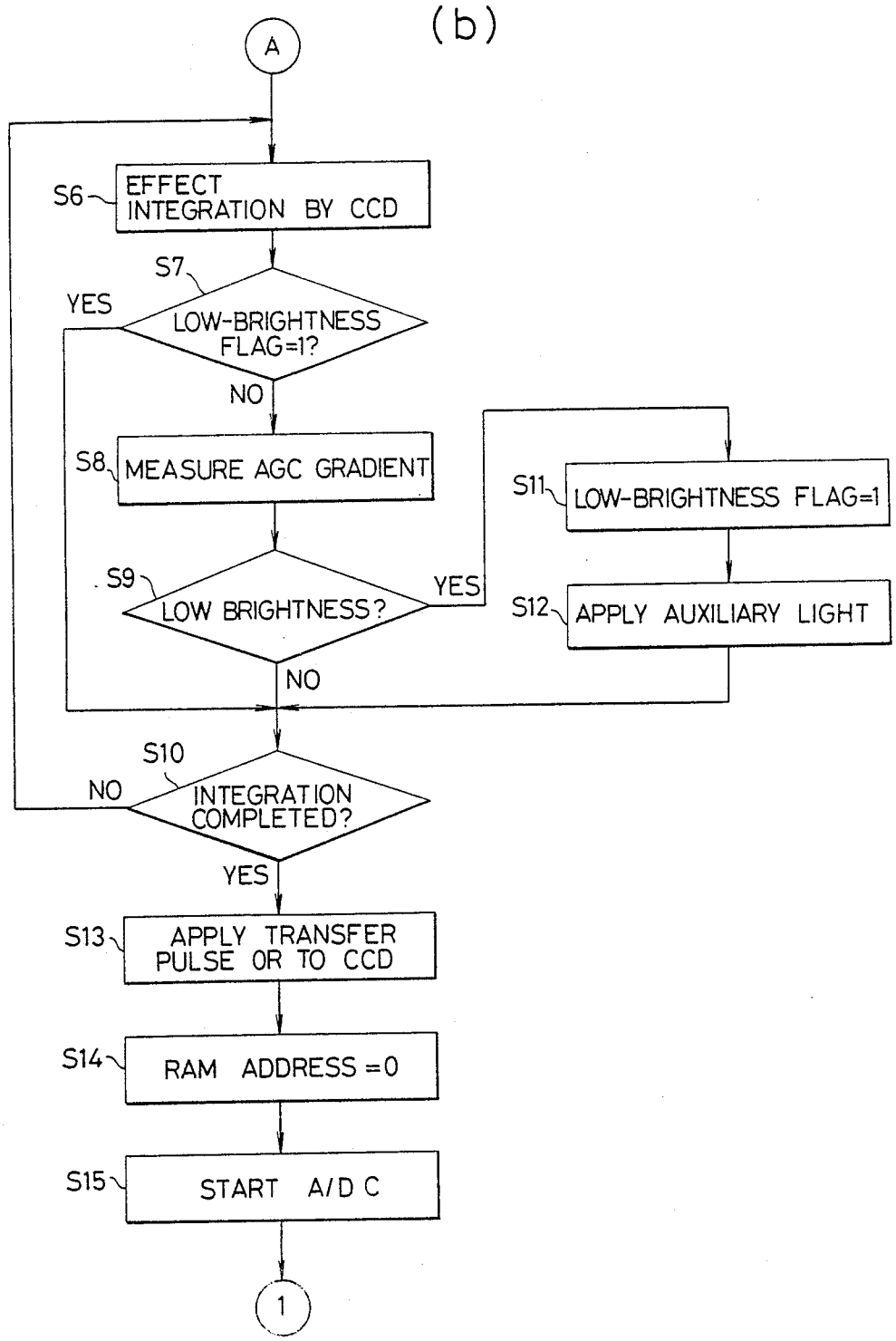
Figure 16:
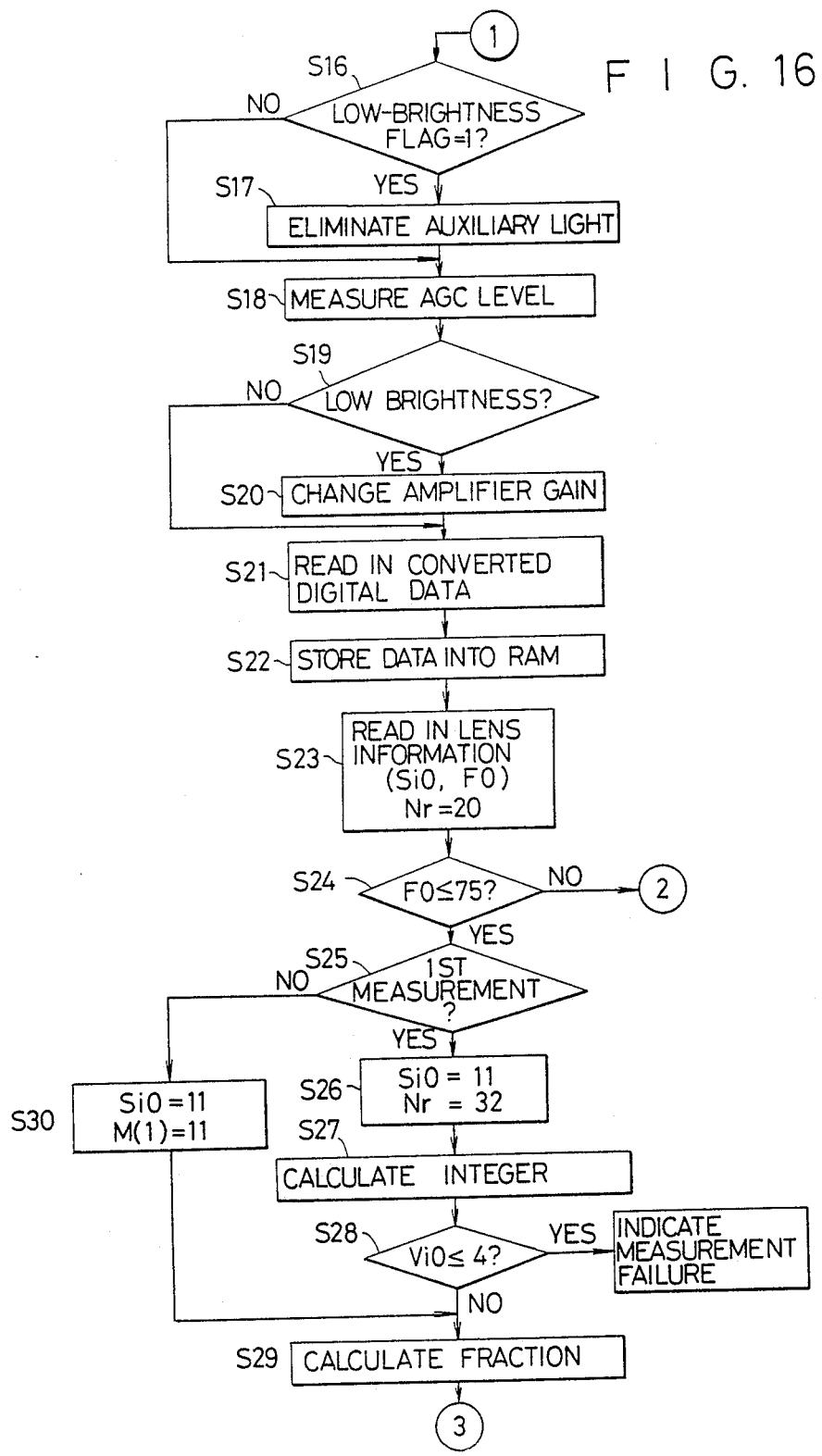
Figure 17A:
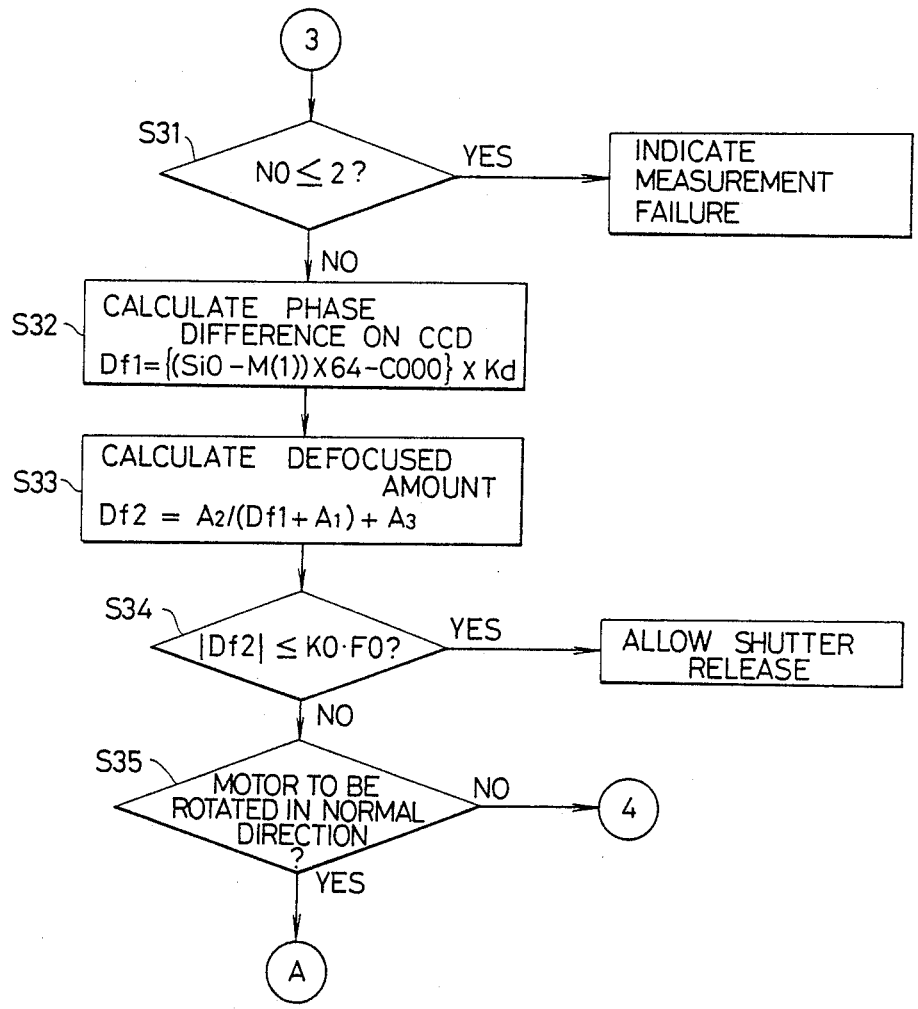
Figure 17B:
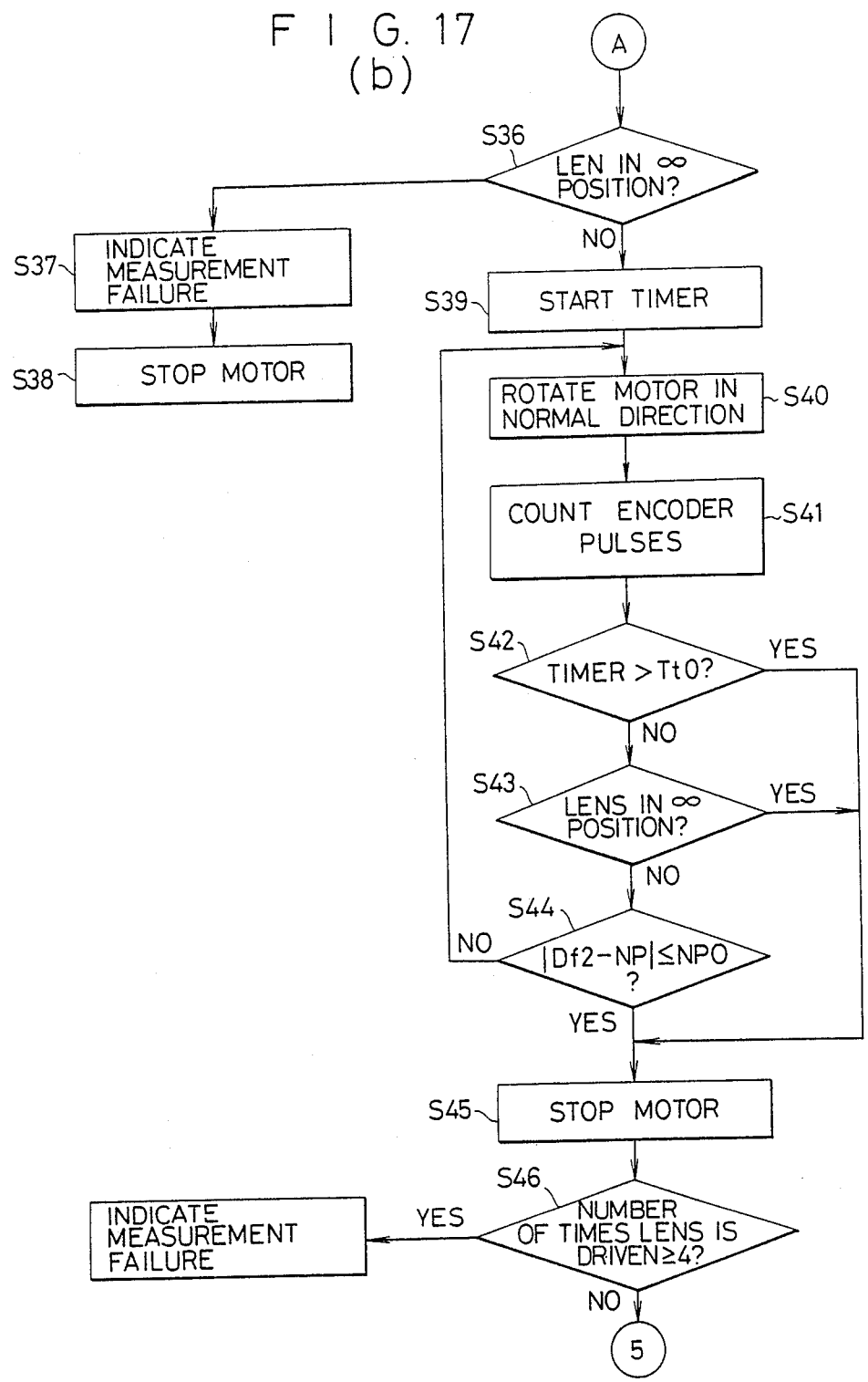
Figure 18:
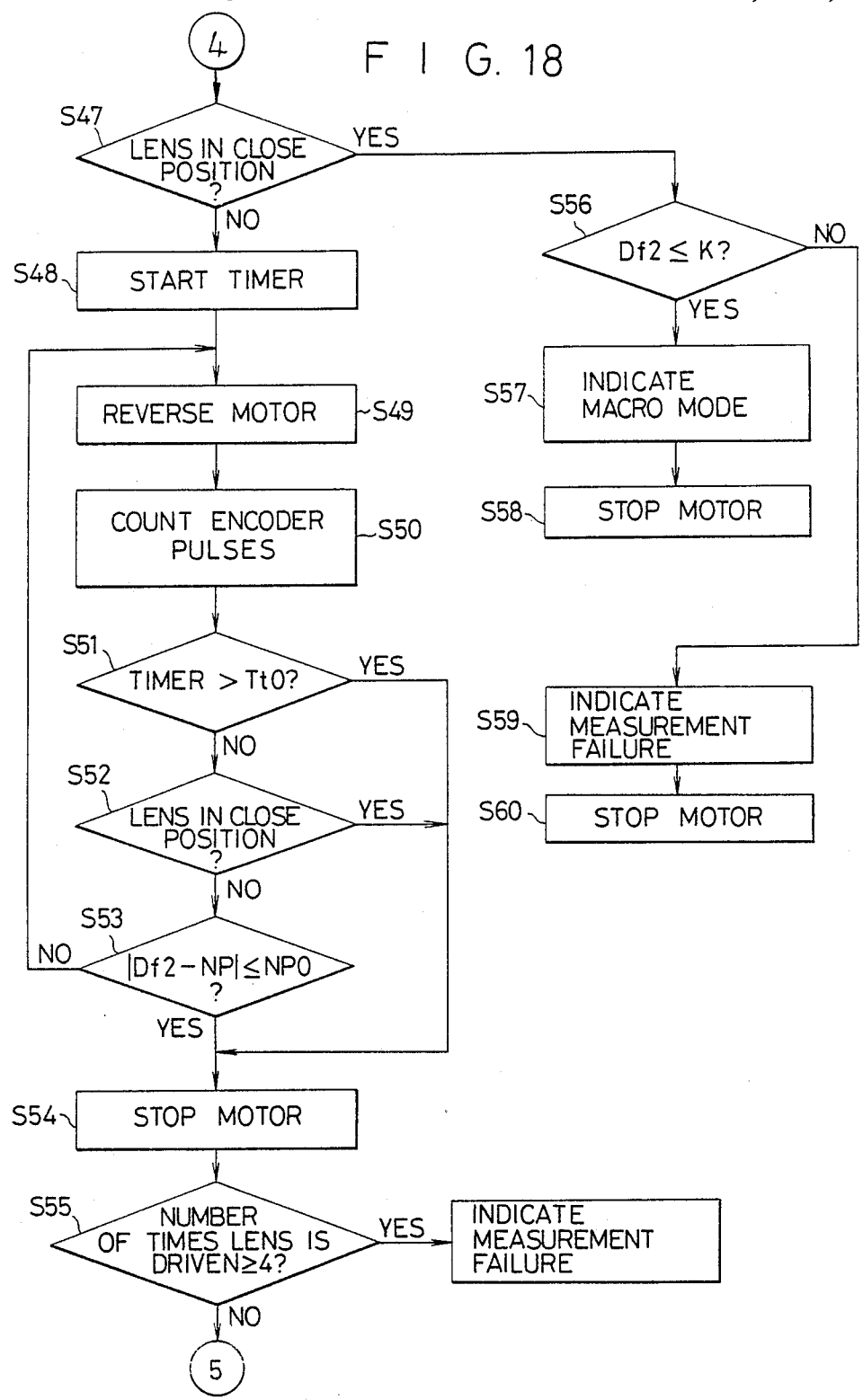
Figure 19:
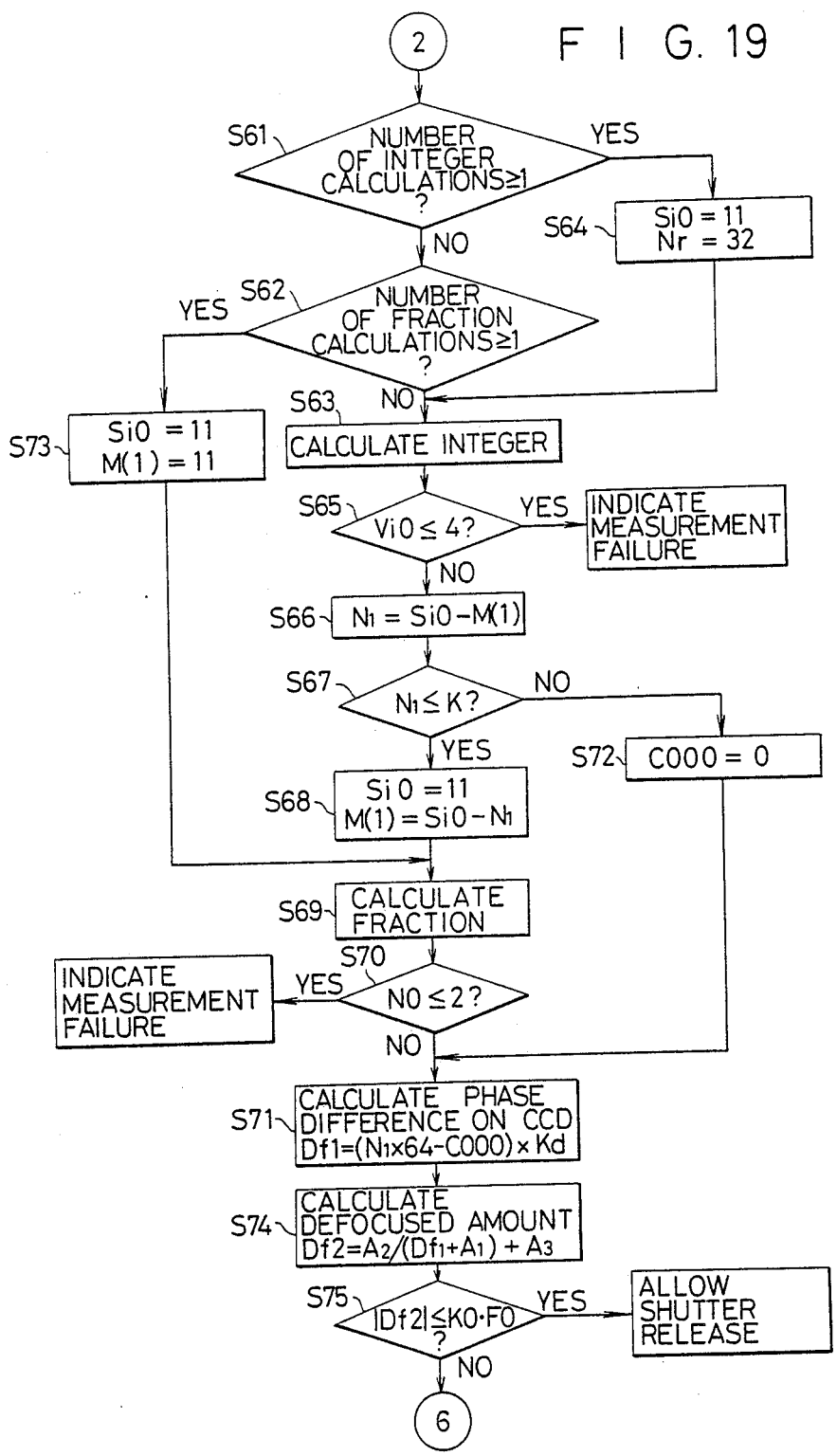
Figure 20:
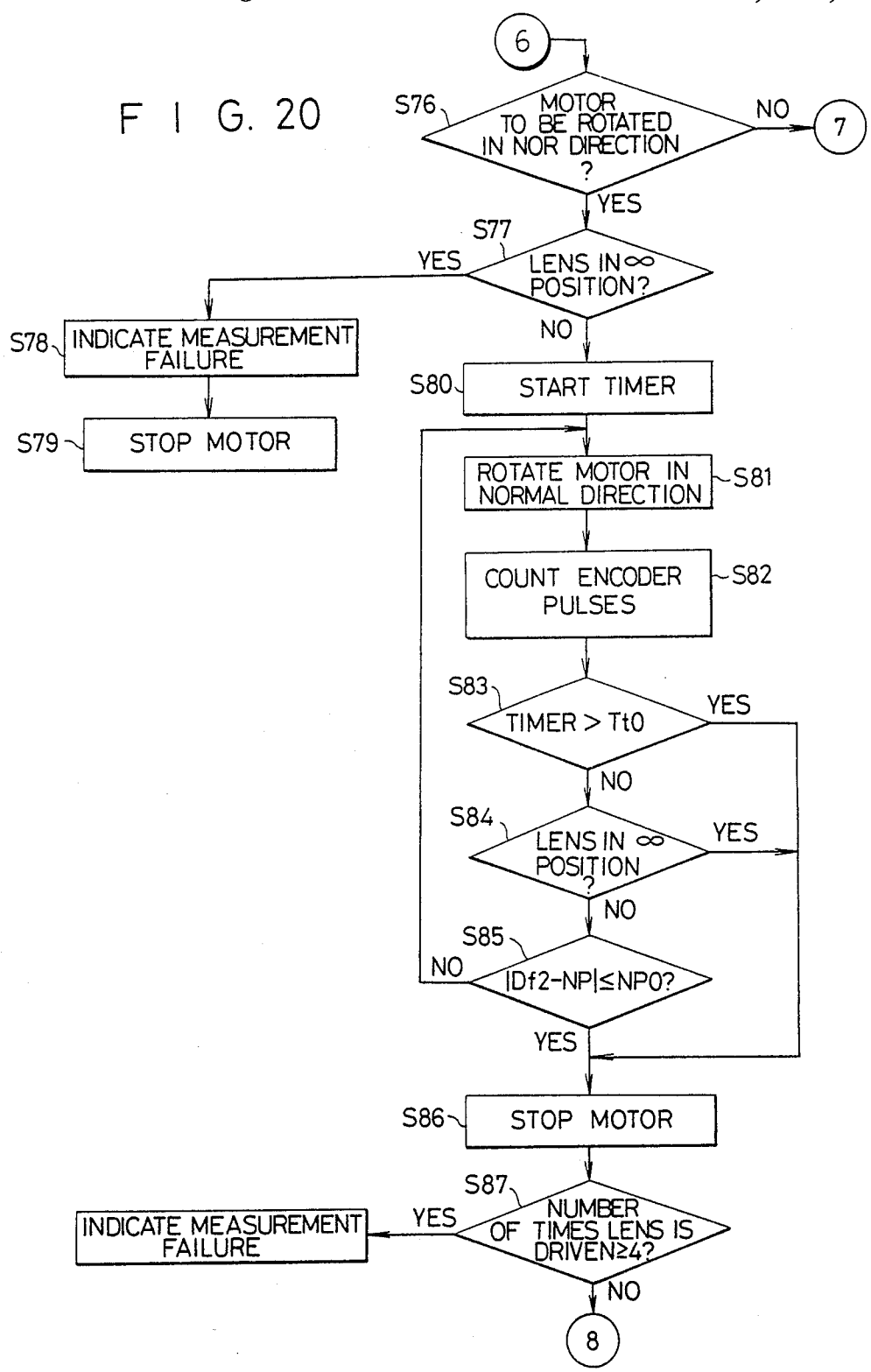
Figure 21:
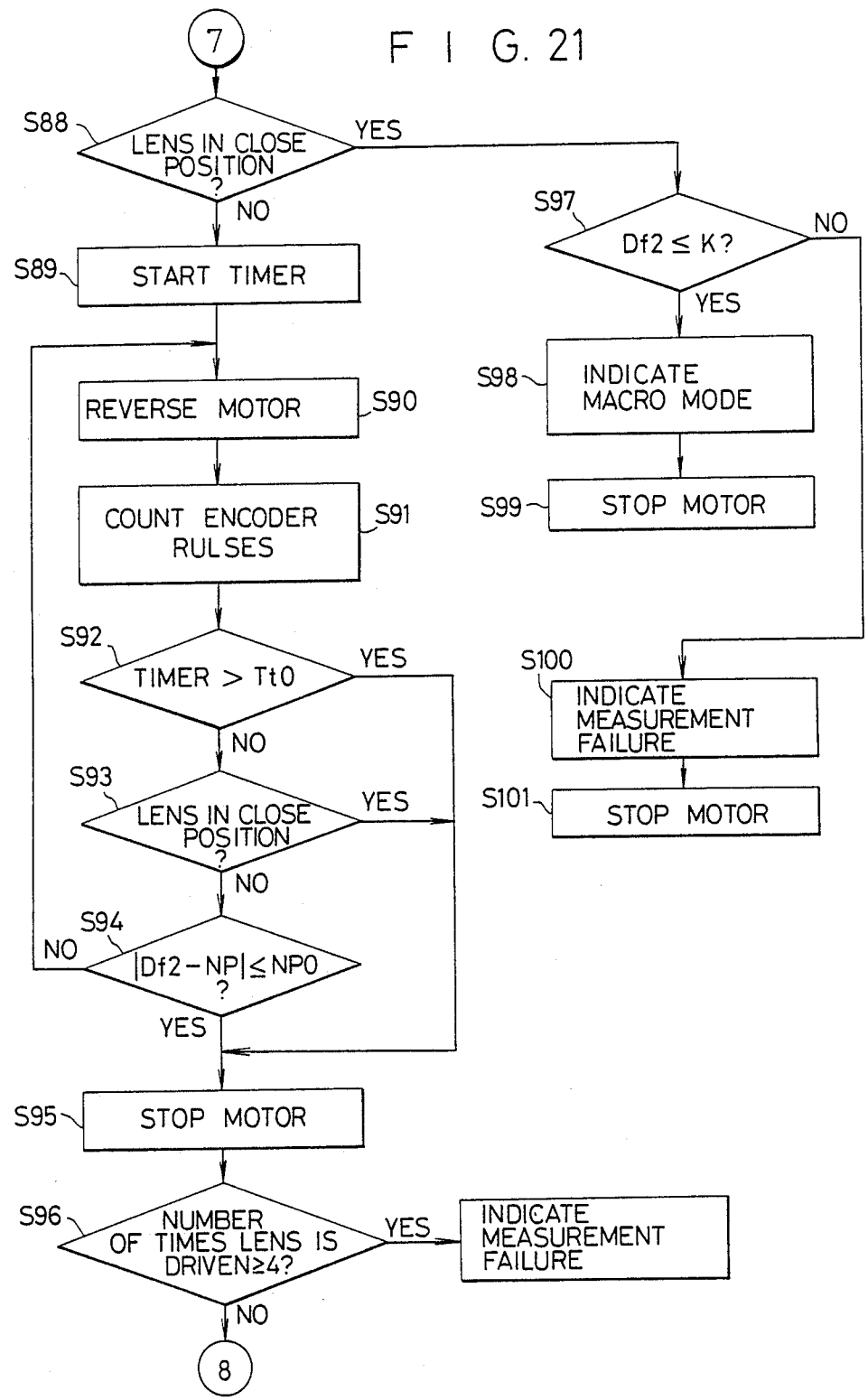

The driver circuit 113 includes a circuit (shown in FIG. 13) for processing an output signal $V_{AGC}$ from a buffer amplifier 121 in the charge-coupled device 112. As illustrated in FIG. 13, the signal $V_{AGC}$ is applied via a buffer amplifier 128 to a comparator 129 for comparison with a comparison voltage $V_S$ from a comparison power supply composed of resistors 130, 131. A $\phi T$ generator 132 is supplied with an output signal from the comparator 129, and applies the transfer pulse $\phi T$ to the charge-coupled device 112 when the output signal of the buffer amplifier 128 is equal to the comparison voltage $V_S$. The output signal from the buffer amplifier 128 is also differentiated by a differentiator circuit 136 comprising an operational amplifier 133, a capacitor 134, and a resistor 135. When the reset pulse $\phi R$ is high, an analog switch 137 is turned on to reset the differentiator circuit 136. As shown in FIG. 14, the output signal $V_{AGC}$ from the buffer amplifier 121 is a monitor signal that is lowered at a gradient (rate) proportional to the amount of light falling on the monitor photodiode array 114, i.e., the brightness of the object. The gradient or the brightness of the object can be detected by differentiating the monitor signal with the differentiator circuit 136.

As shown in FIG. 10, the video signal $V_{OUT}$ from the buffer amplifier 127 in the charge-coupled device 112 is amplified by a variable-magnification amplifier 150, with an offset voltage added thereto, and then converted by an analog-to-digital converter 151 to a digital signal, which is applied through an interface 152 to a microcomputer or central processing unit (hereinafter referred to as a "CPU") 143. The output signal from the differentiator circuit 136 in the driver circuit 113 and the output signal from the buffer amplifier 121 are delivered through a multiplexer 153 to the A/D converter 151 by which they are converted to digital signals, which are applied through the interface 152 to the CPU 143.

Before receiving the video signal from the charge-coupled device 112, the CPU 143 adjusts the gain of the variable-magnification amplifier 150 through a multiplexer 154 according to the output signal that is produced from the buffer amplifier 121 when the transfer pulse oT is issued. The CPU 143 then calculates the amount by which the objective lens 111 is defocused by receiving the video signal from the charge-coupled device 112, which is amplified by the variable-magnification amplifier 150 at a magnification depending upon to the brightness of the object. The focal length and set position of the objective lens 111 are delivered from a focal length detector 155 and a set position detector 156 to the CPU 143 through the multiplexer 153, the A/D converter 154, and the interface 152. Pulses from an encoder 157 and signals from switches 158 through 160 are also applied to the CPU 143. The encoder 157 serves as a rotation detector for detecting the rotation of a motor 161 which drives the objective lens 111. The switches 158 through 160 comprise manually operable switches. The switch 158 selects one, at a time, of manual and automatic modes of automatic focusing operation. The switch 159 is a power supply switch in the form of a release swtich which is turned on when a release button. The switch 160 is a switch for setting an adjustment mode. A manual range setting unit 162 is manually operable to generate a signal for rotating the motor 161. When the automatic focusing mode is selected by the switch 158, the CPU 143 controls a motor driver circuit 163 to rotate the motor 161 based on the calculated defocused amount. When the manual focusing mode is selected by the switch 158, the motor 161 is rotated by the motor driver circuit 163 based on an output signal from the manual range setting unit 162. Immediately after the charge-coupled device 112 has started integration (charge storage), the CPU 143 compares the output signal from the differentiator circuit 136 with a prescribed value. If the output signal from the differentiator circuit 136 is smaller than the prescribed value, then the CPU 143 determines that the object is dark, and energizes a light source 164 to illuminate the object with auxiliary light. At the same time, the CPU 143 eliminates the offset voltage to be added in the variable-magnification amplifier 150 to the output signal. Additionally, the CPU 143 enables an indicator or visual focusing aid 165 to indicate whether the image is sharply focused, overfocused, or underfocused, and receives an open F number of the objective lens 111 from an F-number circuit 166 for use in calculating the defocused amount.

FIGS. 15(a), 15(b), 16, 17(a), 17(b), 18 through 21 are flow charts of an operation sequence of the CPU 143.

The CPU 143 starts to operate when the switch 159 is turned on. Various circuits are reset or initalized in a step S1, and then a release inhibit signal is applied to a sequence controller of the camera to inhibit a shutter release in a step S2. A step S3 then checks a signal from the switch 160. If the switch 160 is turned on, then the adjustment mode is initiated which is set when the camera is assembled or serviced. If the switch 160 is turned off, control proceeds to a step S4 in which the number of photodiodes vi$\phi$, an integration flag, and a low-brightness flag are reset, and the charge-coupled device 112 is initialized. Then, a reset pulses $\phi R$ is applied to the CCD driver circuit 113 in a step S5, which is followed by a step S6 in which the reset pulse $\phi R$ is turned off to effect integration by the charge-coupled device 112 and, simultaneously, a timer is started. A step S7 checks the low-brightness flag. Since the low-brightness flag has been reset, control goes to a step S8 which measures the gradient of the monitor signal $V_{AGC}$ by measuring the output signal from the differentiator circuit 136 in the driver circuit 113. Then, a step S9 ascertains whether the object is of low brightness (dark) or not by checking if the output signal from the differentiator circuit 136 is smaller than a prescribed value or not. If the object is not of low brightness, then control proceeds to a next step S10. If the object is of low brightness, then control goes to a step S11 which sets the low-brightness flag and then to a step S12 which energizes the light source 164. Control goes from the step S12 to the step S10. The step S10 ascertains whether the integration by the charge-coupled device 112 is completed or not by checking if the output signal from the comparator 147 is zero or not. The integration by the charge-coupled device 112 is regarded as completed also when the aforesaid timer has run out even if the output signal from the comparator 147 is not zero. If the integration by the charge-coupled device 112 has not been completed, then control returns to the step S6 and repeats the steps S6 through S10. If the object is low in brightness and the light source 164 is energized, then control jumps from the step S7 to the step S10. If the integration by the charge-coupled device 112 is subsequently completed, then control proceeds from the step S10 to a step S13 in which the transfer pulse $\phi T$ is applied by the CCD driver circuit 113 to the charge-coupled device 112. A random-access memory (RAM) is cleared in a next step S14, and the A/D converter 151 starts to convert the video signal from the charge-coupled device 112 to a corresponding digital signal in a step S15. The low-brightness flag is then checked in a step S16. If it is not set, then control goes to a step S18. If it is set, then the light source 164 is de-energized upon completion of the charge storage by the charge-coupled device 112 in a step S17, which is followed by the step S18. The step S18 measures the output siganl of the buffer amplifier 121 at the time the transfer pulse is issued. Then, a step S19 ascertains, from the measured output signal, whether the object image is of low brightness or not. If the object image is not low in brightness, then control goes to a step S21. If the object is low in brightness, then the gain of the variable-magnification amplifier 150 is changed to a large value dependent on the output signal from the buffer amplifier 121 in a step S20, from which control proceeds to the step S21. The step S21 reads in the digital signal converted by the A/D converter 151 from the video signal delivered from the charge-coupled device 112. The read digital signal is then stored into the RAM in step S22. In a next step S23, lens information $Si\phi$, $F\phi$ are read from the detectors 155, 156, and the number Nr is selected to be 20.

A step S24 then ascertains whether the focal length $F\phi$ of the objective lens 111 is at most 75 mm or not. If 75 mm or less, then control goes to a step S25 which counts how many times the distance has been measured after the switch 159 has been turned on and hence which ascertains whether the distance measurement is the first measurement or not. If it is the first measurement, then a step S26 sets the set position $Si\phi$ of the lens 111 to "11" and the number Nr to "32". The number Nr is the number of photodiodes in comparison ranges (1) and (2) used in determining how the distance between images on the photodiode array portions A, B of the charge-coupled device 112 varies from the well-focused condition by moving the comparison range (2) while the other comparison range (1) is being fixed to a value according to $Si\phi$. The comparison range (1) is from $Si\phi$ to Nr. The amount by which the image-to-image distance varies can be determined by calculating how many photodiode pitches (integer) are involved and then by calculating how many fractions smaller than the pitch are involved. The involved photodiode pitches or integer is calculated in a step S27 to determine the maximum number $vi\phi$ of photodiodes in coinciding ranges Nr for the images respectively on the photodiode array portions A, B and to determine the amount (integer) M(1) by which the image-to-image distance varies. Then, a step S28 ascertains whether the maximum number $vi\phi$ is at most 4 or not. If it is 4 or less, then an indication of distance measurement failure is indicated on the indicator 165. If not 4 or less, then the fraction $C\phi$ by which the image-to-image distance varies is calculated in a step S29.

In the second and following distance measurements, control goes from the step S25 to a step S30 which sets the lens set position $Si\phi$ to "11" and the integer M(1) to "1", and then to the step S29 without calculating the integer in the step S27.

The step S29 is followed by a step S31 which ascertains whether the number $N\phi$ of photodiodes is at most 2 that produce a high-contrast video signal and can be used for data comparison in calculating the fraction. If the number $N\phi$ is 2 or less, then an indication of distance measurement failure is indicated on the indicator 165. If not 2 or less, then a deviation Df1 of the image on the charge-coupled device 112 from the focused position is calculated in a step S32 by the following equation:

$$Df1 = \{(Si\phi - M(1)) \times 64 - C\phi\} \times Kd$$

Thereafter, the amount Df2 by which the lens 111 is defocused is calculated in a step S33 by the following equation:

$$Df2 = A_2/(Df1 - A_1) + A_3$$

A step 34 ascertains whether the absolute value of the defocused amount Df2 is at most a prescribed value $K\phi \cdot F\phi$ or not. If the absolute value of the defocused amount Df2 is the prescribed value $K\phi \cdot F\phi$ or less, then it is determined that the lens 111 is in the focused position, and the release inhibit signal that has been applied to the sequence controller is removed to allow the shutter to be released.

If the absolute value of the defocused amount Df2 is not the prescribed value $K\phi \cdot F\phi$ or less, then a step S35 ascertains, from the sign of the defocused amount, whether the motor 161 is to be rotated in a normal direction or not in order to move the lens 111 into the focused position. If the motor 161 is to be rotated in the normal direction, then a step S36 ascertains whether the lens 111 is in an infinite position or not. The motor 161, when rotated in the normal direction, moves the lens 111 into a remote position, and, when rotated in the reverse direction, moves the lens 111 into a closer position. If the lens 111 is in the infinite position, then a distance measurement failure is indicated on the indicator 165 in a step S37, and the motor 161 is de-energized in a step S38. If the lens 111 is not in the infinite position, then control proceeds to a step S39 which starts a timer, then to a step S40 which rotates the motor 161 in the normal direction, and to a step S41 which counts pulses from the encoder 157. A step 42 ascertains whether the timer has run out or not. A step 43 then ascertains whether the lens 111 has reached the infinite position, and a step S44 ascertains whether the absolute value $|Df2-NP|$ of the difference between the defocused amount Df2 and the count NP of pulses from the encoder 157 has reached at most a prescribed value $NP\phi$ or not. If the timer has not run out, if the lens 111 has not reached the infinite position, and if the condition $|Df2-NP| \leq NP\phi$ is not reached, then control returns to the step S40 to keep on rotating the motor 161 in the normal direction. If at least one of the steps S42, S43, S44 resulted in YES, then the motor 161 is de-energized in a step S45, and a step S46 ascertains whether the number of times at which the motor 161 is driven has reached "4". If it has reached "4", then a distance measurement failure is indicated on the indicator 165. If not, then control goes back to the step S4.

If the motor 161 is to be reversed in the step S35, a step S47 ascertains whether the lens 111 is in a close position. If the lens 111 is not in the close position, then the timer is started in a step S48, and the motor 161 is reversed in a step S49. Then, a step S50 counts pulses from the encoder 157. Thereafter, steps S51 through S53 ascertain whether the timer has run out or not, whether the lens 111 has reached the close position, and whether $|Df2-NP \leq NP\phi$, respectively. If the timer has not run out, if the lens 111 has not reached the close position, and if the condition $|Df2-NP| \leq NP\phi$ has not been met, then control returns to the step S49 to keep on reversing the motor 161. If any of the steps S51 through S53 results in YES, then the motor 161 is de-energized in a step S54. The step S54 is followed by a step S55 which ascertains whether the lens 111 has been driven four times. If the lens 111 has been driven four times, then a measurement failure is indicated on the indicator 165. If not, control goes back to the step S4.

If the lens 111 is in the closed position in the step S47, then a step S56 ascertains whether the defocused amount Df2 is of at most a prescribed value or not. If the defocused amount is of the prescribed value or less, then a macro mode is indicated on the indicator 165 in a step S57, and the motor 161 is de-energized in a step S58. If the defocused amount is not of the prescribed value or less, then a step S59 indicates a measurement failure on the indicator 165, and a step S60 de-energizes the motor 161.

If the focal length $F\phi$ of the lens 111 is not 75 mm or less in the step S24, then control proceeds to a step S61 which counts how many integer calculations are made (no fraction calculation is effected) and which ascertains whether an integer is calculated once or more. If the integer is calculated once or more, a step S64 sets $Si\phi$ to "11" and Nr to "32", and the integer is calculated in a step S63. If no integer calculation is made, then a step S62 counts how many fraction calculations are made and ascertains whether the number of fraction calculations has reached "1". If not, then the step S63 calculates the integer. Sio is read in from the detector 156, and the comparison range (1) is established according to the read Sio. Thereafter, control goes to a step S65 which ascertains whether the maximum value $vi\phi$ of numbers that have coincided upon data comparison in the fraction calculation is at most 4 or not. If 4 or less, then a measurement failure is indicated on the indicator 165. If not 4 or less, then a step S66 determines $N_1 = Si\phi - M(1)$, and a step S67 ascertains whether $N_1$ is of at most a prescribed value or not. If $N_1$ is of the prescribed value or less, then a step S68 sets $Si\phi$ to "11" and M(1) to $Si\phi - N_1$, and the fraction is calculated in a step S69. Thereafter, a step S70 ascertains whether the number $N\phi$ of data items that have been employed in data comparison in the fraction calculation is at most 2 or not. If $N\phi \leq 2$, then a measurement failure is indicated on the indicator 165. If not, then control proceeds to a step S71 which calculates the deviation Df1 of the image according to the following equation:

$$Df1 = (N_1 \times 64 - C\phi) \times Kd$$

If $N_1$ is not of the prescribed value or less in the step S67, a step S72 sets $C\phi$ to "0", and then control goes to a step S71. If the number of fraction calculations has reached "1" in the step S62, then a step S73 sets $Si\phi$ to "11" and M(1) to "11", and control goes to the step S69.

Steps S74 through S101 are the same as the steps S33 through S60, and will not be described in detail.

FIG. 22 shows a driver circuit in an automatic focusing device according to another embodiment of the present invention. Those in FIG. 22 which are identical to those shown in FIG. 13 are denoted by identical reference numerals and will not be described in detail.

Figure 23:
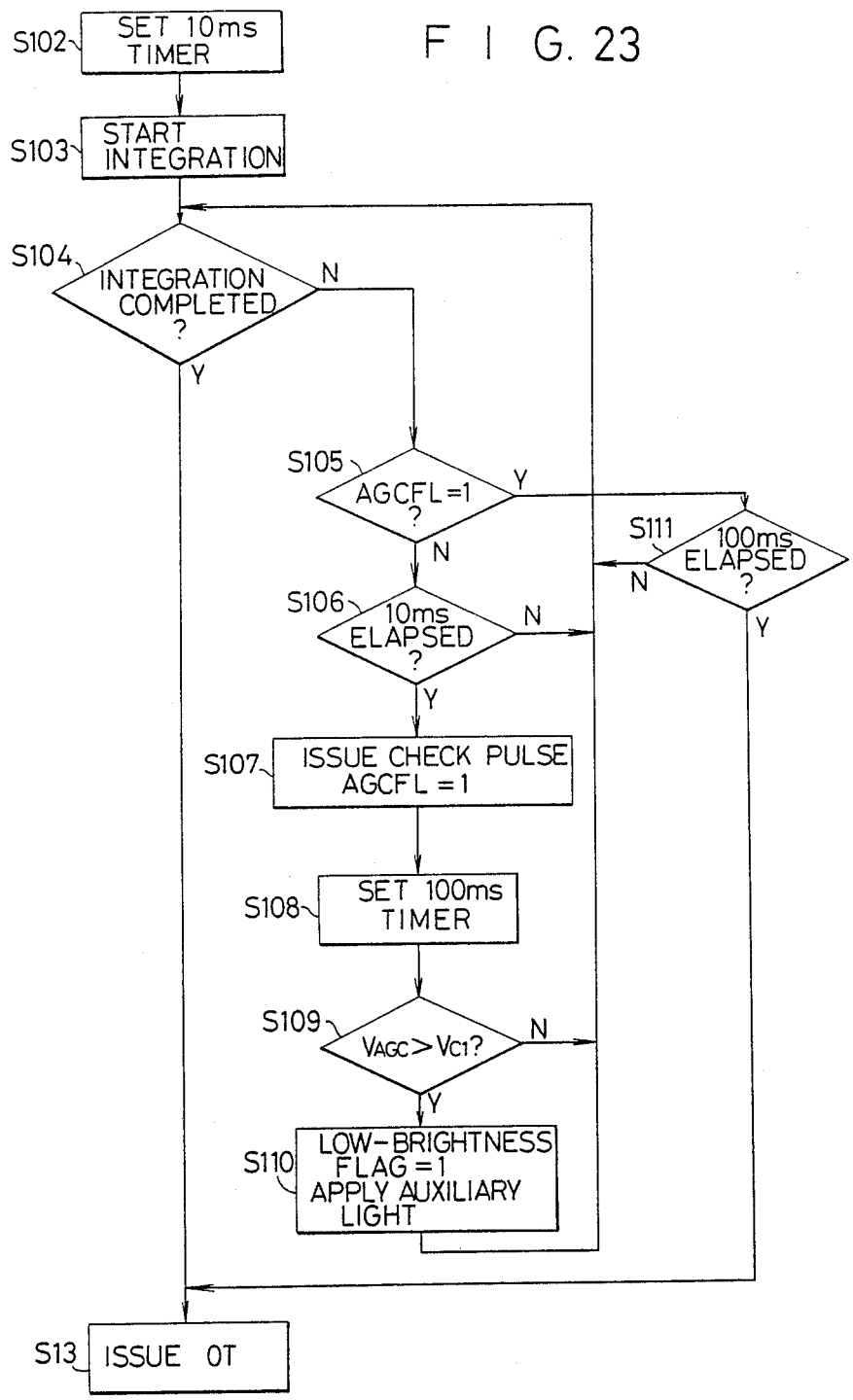
FIG. 23 is a flow chart of an operation sequence of a CPU in the automatic focusing device of FIG. 22.

In FIG. 22, the output signal from the buffer amplifier 128 in the driver 113 is compared by a comparator 167 with a comparison voltage Vc1 from a comparison power supply composed of resistors 168, 169. When the output signal of the buffer amplifier 128 is higher than the comparison voltage Vc1, the output signal from the comparator 167 goes high. The output signal from the comparator 167 and a check pulse from the CPU 143 are applied to a NAND gate 170, which produces a low-level output signal when the output signal from the comparator 167 and the check pulse are high. An R-S flip-flop 171 is reset by the reset pulse $\phi R$, and set by a negative-going edge of the output signal from the NAND gate 170. The CPU 143 executes steps S102 through S111 (shown in FIG. 23) instead of the steps S6 through S12. More specifically, control goes from the step S5 to a step S102 which sets a 10 ms timer. In a step S103, the reset pulse oR is turned off and integration by the charge-coupled device 112 is started. A step S104 ascertains whether the integration by the charge-coupled device 112 is completed or not by ascertaining whether the output signal from the comparator 129 went low. If the integration by the charge-coupled device 112 is not completed, then control goes to a step S105 to check a monitor flag AGCFL. If the monitor flag AGCFL is not set, then the 10 ms timer is checked in a step S106. If the 10 ms timer has not run out, then control returns to the step S104. If the 10 ms timer has run out, then the monitor flag AGCFL is set and a check pulse is issued to the NAND gate 170 in a step S107. A 100 ms timer is then set in a step S108, and then the output signal from the flip-flop 171 is checked in a step S109. When the object is bright, the output signal from the buffer amplifier 128 has a larger gradient as shown in FIG. 25 and is lower in level than the comparison voltage Vc1 when the check pulse is issued. Therefore, the output signal from the flip-flop 171 is low in level, and hence control goes back to the step S104. When the object is dark, the gradient of the output signal from the buffer amplifier 128 is smaller as shown in FIG. 24 and is higher than the comparison voltage Vc1 when the check pulse is issued. Thus, the output signal of the flip-flop 171 is high in level, and control goes to a step S110 in which the low-brightness flag is set and the light source 164 is energized to apply auxiliary light. Thereafter, control returns from the step S110 to the step S104. If the monitor flag AGCFL is set, control goes from the step S105 to a step S111 to check the 100 ms timer. If the 100 ms timer has not run out, then control goes back to the step S104. If the integration by the charge-coupled device 112 is completed or the 100 ms timer has run out, control proceeds to the step S13.

With the automatic focusing device of the present invention, a monitor signal is produced from an output signal from the monitor photodetector, the monitor signal being variable at a gradient dependent on the amount of light falling on the monitor photodetector, and a variation in the monitor detector is checked immediately after a charge has started to be stored by the charge-storage photodetector, for thereby determining the brightness of an object. When the object is dark, the light source means is energized only while the charge is being stored in the charge-storage photodetector. Therefore, the time required for distance measurement can be shortened, and hence the power supply consumption can be reduced. The brightness of the object can accurately be checked since it is checked by using the monitor photodetector. Adverse effects due to noise are reduced since the object is immediately illuminated when it is dark.

Although certain preferred embodiments have been shown and described, it should be understood that many changes and modifications may be made therein without departing from the scope of the appended claims.

We claim:

1. An image signal amplifier circuit for a focus detecting device for detecting the focus of a camera by processing an image signal from a self-scanned image sensor having a storage electrode and an analog shift register for transferring a stored charge from said storage electrode, said image signal amplifier circuit comprising monitor photodetector means for detecting the brightness of an object to be photographed by the camera, amplifier means having automatic gain control means for controlling the amplification degree of the image signal based on an output signal from said monitor photodetector means so that the amplified image signal from said image sensor will be of a constant level, offset generator means for adding an offset voltage to an output signal from said amplifier means, detector means for detecting when a limit of the ability of said automatic gain control means is exeeded, means for producing an auxiliary light in response to an output from said detector means, and offset reducer means for eliminating said offset voltage in response to said output signal from said detector means.

2. An image signal amplifier circuit according to claim 1, further including a monitor circuit for generating a monitor signal which is set to a prescribed level by a reset pulse that resets the storage electrode of said image sensor and which is lowered in level at a rate commensurate with the brightness of the object by an output signal from said monitor photodetector means at the same time that the reset pulse is eliminated, shift pulse generator means responsive to an input signal for generating a shift pulse for shifting a charge from said storage electrode into said analog shift register, a comparator circuit for generating the input signal to be applied to said shift pulse generator means when said monitor signal from said monitor circuit becomes lower than a predetermined reference voltage, timer means for generating the input signal to be applied to said shift pulse generator means when said monitor signal is not lowered to said reference voltage even upon elapse of a prescribed time since generation of said reset pulse, and memory means for storing the monitor signal from said monitor circuit at substantially the same timing as said shift pulse, the arrangement being such that the image signal from said image sensor is amplified by said amplifier means at an amplification degree G which is given by:

$$G = K \frac{Vr1}{V_M}$$

where K is a constant, Vr1 is the reference voltage, and Vr1 is the monitor signal stored in said memory means.

3. A focus detecting device including said image signal amplifier circuit according to claim 1, and further comprising illuminating means for illuminating the object, focus detecting means for detecting the focus of the camera based on the output signal from said amplifier means, monitor signal producing means for producing a monitor signal from the output signal from said monitor photodetector means, said monitor signal being variable at a gradient commensurate with the amount of light falling on said monitor photodetector means, monitor signal checking means for checking a variation in said monitor signal immediately after a charge has started to be stored by said image sensor in order to ascertain whether the object is dark or not, and control means responsive to an output signal from said monitor signal checking means for energizing said illuminating means while the charge is being stored by said image sensor when the object is dark.

* * * * *